(12) United States Patent
Hulten et al.

(10) Patent No.: US 8,898,687 B2
(45) Date of Patent: Nov. 25, 2014

(54) CONTROLLING A MEDIA PROGRAM BASED ON A MEDIA REACTION

(75) Inventors: Geoffrey J Hulten, Lynnwood, WA (US); Umaimah A. Mendhro, San Francisco, CA (US); Kyle J. Krum, Sammamish, WA (US); Michael J. Conrad, Monroe, WA (US); Darren B. Remington, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/439,284

(22) Filed: Apr. 4, 2012

(65) Prior Publication Data

US 2013/0268954 A1    Oct. 10, 2013

(51) Int. Cl.
*H04H 60/56* (2008.01)
*H04N 7/16* (2011.01)

(52) U.S. Cl.
USPC ............................................ 725/12; 725/28

(58) Field of Classification Search
CPC .. H04N 21/44222; H04H 60/33; H04H 60/58
USPC ............................................ 725/10, 12, 28
See application file for complete search history.

(56) References Cited

U.S. PATENT DOCUMENTS

| | | | |
|---|---|---|---|
| 4,288,078 A | 9/1981 | Lugo | |
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 4,931,865 A | 6/1990 | Scarampi | |
| 5,101,444 A | 3/1992 | Wilson et al. | |

(Continued)

FOREIGN PATENT DOCUMENTS

| | | |
|---|---|---|
| CA | 2775700 | 7/2012 |
| CA | 2775814 | 9/2013 |

(Continued)

OTHER PUBLICATIONS

"Foreign Office Action", Canadian Application No. 2775814, (Aug. 24, 2012), 3 pages.

(Continued)

*Primary Examiner* — Nathan Flynn
*Assistant Examiner* — Sumaiya A Chowdhury
(74) *Attorney, Agent, or Firm* — Bryan Webster; Kate Drakos; Micky Minhas

(57) ABSTRACT

This document describes techniques and apparatuses for controlling a media program based on a media reaction. In some embodiments, the techniques pause, mute, or stop a media program when a user leaves the room, when a user in the room is talking or is otherwise not paying attention to the program, or when a child walks into the room.

20 Claims, 11 Drawing Sheets

(56) References Cited

U.S. PATENT DOCUMENTS

| | | | |
|---|---|---|---|
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,805,167 A | 9/1998 | van Cruyningen |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 5/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 5,999,766 A | 12/1999 | Hisatomi et al. |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama et al. |
| 6,115,482 A | 9/2000 | Sears |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 | 1/2001 | Liu |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 | 9/2001 | Liu |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 | 2/2003 | Liu |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,622,119 B1 | 9/2003 | Ramaswamy et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Seeley et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,881,526 B2 | 4/2005 | Bobeck et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 | 10/2006 | Dryer et al. |
| 7,121,946 B2 | 10/2006 | Paul et al. |
| 7,134,130 B1 * | 11/2006 | Thomas ............... 725/25 |
| 7,145,330 B2 | 12/2006 | Xiao |
| 7,151,530 B2 | 12/2006 | Roeber et al. |
| 7,155,305 B2 | 12/2006 | Hayes et al. |

(56) References Cited

U.S. PATENT DOCUMENTS

| | | | |
|---|---|---|---|
| 7,162,082 B2 | 1/2007 | Edwards |
| 7,170,492 B2 | 1/2007 | Bell |
| 7,170,605 B2 | 1/2007 | Cromwell et al. |
| 7,184,048 B2 | 2/2007 | Hunter |
| 7,202,898 B1 | 4/2007 | Braun et al. |
| 7,212,665 B2 | 5/2007 | Yang et al |
| 7,214,932 B2 | 5/2007 | Brunfeld et al. |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,435,941 B2 | 10/2008 | Ayres |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,487,375 B2 | 2/2009 | Lourie et al. |
| 7,489,812 B2 | 2/2009 | Fox et al. |
| 7,512,889 B2 | 3/2009 | Newell et al. |
| 7,536,032 B2 | 5/2009 | Bell |
| 7,538,782 B2 | 5/2009 | Kuroki et al. |
| 7,555,142 B2 | 6/2009 | Hildreth et al. |
| 7,559,841 B2 | 7/2009 | Hashimoto |
| 7,560,701 B2 | 7/2009 | Oggier et al. |
| 7,568,116 B2 | 7/2009 | Dooley et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,636,456 B2 | 12/2009 | Collins et al. |
| 7,640,304 B1 | 12/2009 | Goldscheider |
| 7,643,056 B2 | 1/2010 | Silsby |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,140 B2 | 6/2010 | Vinson et al. |
| 7,746,345 B2 | 6/2010 | Hunter |
| 7,752,633 B1 | 7/2010 | Fleming |
| 7,760,182 B2 | 7/2010 | Ahmad et al. |
| 7,762,665 B2 | 7/2010 | Vertegaal et al. |
| 7,764,311 B2 | 7/2010 | Bill |
| 7,770,136 B2 | 8/2010 | Beeck et al. |
| 7,809,167 B2 | 10/2010 | Bell |
| 7,814,518 B2 | 10/2010 | Ducheneaut et al. |
| 7,834,846 B1 | 11/2010 | Bell |
| 7,836,480 B1 | 11/2010 | Harvey et al. |
| 7,852,262 B2 | 12/2010 | Namineni et al. |
| 7,889,073 B2 | 2/2011 | Zalewski |
| 7,895,076 B2 | 2/2011 | Kutaragi et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,081,302 B2 | 12/2011 | Paluszek et al. |
| 8,096,660 B2 | 1/2012 | Vertegaal et al. |
| 8,102,422 B1 | 1/2012 | Kenderov et al. |
| 8,132,187 B2 | 3/2012 | Klyuchevskyy |
| 8,141,775 B1 | 3/2012 | Aidasani et al. |
| 8,189,053 B2 | 5/2012 | Pryor |
| 8,260,740 B2 | 9/2012 | Davis et al. |
| 8,322,856 B2 | 12/2012 | Vertegaal et al. |
| 8,327,395 B2 | 12/2012 | Lee et al. |
| 8,332,883 B2 | 12/2012 | Lee et al. |
| 8,418,085 B2 | 4/2013 | Snook et al. |
| 8,471,868 B1 | 6/2013 | Wilson et al. |
| 8,499,245 B1 | 7/2013 | Froment et al. |
| 8,620,113 B2 | 12/2013 | Yee |
| 8,635,637 B2 | 1/2014 | Krum |
| 8,660,303 B2 | 2/2014 | Izadi et al. |
| 8,760,395 B2 | 6/2014 | Kim et al. |
| 2001/0021994 A1 | 9/2001 | Nash |
| 2002/0041327 A1 | 4/2002 | Hildreth et al. |
| 2002/0072952 A1 | 6/2002 | Hamzy et al. |
| 2002/0073417 A1 | 6/2002 | Kondo et al. |
| 2002/0120925 A1* | 8/2002 | Logan ............................. 725/9 |
| 2002/0144259 A1 | 10/2002 | Gutta et al. |
| 2002/0157095 A1 | 10/2002 | Masumitsu et al. |
| 2002/0174230 A1 | 11/2002 | Gudorf et al. |
| 2002/0174445 A1 | 11/2002 | Miller et al. |
| 2002/0178446 A1 | 11/2002 | Sie et al. |
| 2003/0001846 A1 | 1/2003 | Davis et al. |
| 2003/0005439 A1 | 1/2003 | Rovira |
| 2003/0007018 A1 | 1/2003 | Seni et al. |
| 2003/0033600 A1 | 2/2003 | Cliff et al. |
| 2003/0066071 A1 | 4/2003 | Gutta et al. |
| 2003/0074661 A1 | 4/2003 | Krapf et al. |
| 2003/0093784 A1 | 5/2003 | Dimitrova et al. |
| 2003/0118974 A1 | 6/2003 | Obrador |
| 2003/0141360 A1 | 7/2003 | De Leo et al. |
| 2003/0167358 A1 | 9/2003 | Marvin et al. |
| 2004/0001616 A1 | 1/2004 | Gutta et al. |
| 2004/0046736 A1 | 3/2004 | Pryor et al. |
| 2004/0056907 A1 | 3/2004 | Sharma et al. |
| 2004/0068409 A1 | 4/2004 | Tanaka et al. |
| 2004/0070573 A1 | 4/2004 | Graham |
| 2004/0113933 A1 | 6/2004 | Guler |
| 2004/0155962 A1 | 8/2004 | Marks |
| 2004/0168190 A1 | 8/2004 | Saari et al. |
| 2004/0189720 A1 | 9/2004 | Wilson et al. |
| 2004/0193413 A1 | 9/2004 | Wilson et al. |
| 2004/0207597 A1 | 10/2004 | Marks |
| 2005/0059488 A1 | 3/2005 | Larsen et al. |
| 2005/0076365 A1 | 4/2005 | Popov et al. |
| 2005/0082480 A1 | 4/2005 | Wagner et al. |
| 2005/0190973 A1 | 9/2005 | Kristensson et al. |
| 2005/0212767 A1 | 9/2005 | Marvit et al. |
| 2005/0215319 A1 | 9/2005 | Rigopulos et al. |
| 2005/0223237 A1 | 10/2005 | Barletta et al. |
| 2005/0229199 A1 | 10/2005 | Yabe |
| 2005/0234998 A1 | 10/2005 | Lesandrini et al. |
| 2005/0289582 A1 | 12/2005 | Tavares et al. |
| 2006/0031776 A1 | 2/2006 | Glein et al. |
| 2006/0031786 A1 | 2/2006 | Hillis et al. |
| 2006/0055685 A1 | 3/2006 | Rimas-Ribikauskas et al. |
| 2006/0073816 A1 | 4/2006 | Kim et al. |
| 2006/0101349 A1 | 5/2006 | Lieberman et al. |
| 2006/0123360 A1 | 6/2006 | Anwar et al. |
| 2006/0158307 A1 | 7/2006 | Lee et al. |
| 2006/0174313 A1 | 8/2006 | Ducheneaut et al. |
| 2006/0184800 A1 | 8/2006 | Rosenberg |
| 2006/0188144 A1 | 8/2006 | Sasaki et al. |
| 2006/0188234 A1* | 8/2006 | Takeshita ....................... 386/107 |
| 2006/0200780 A1 | 9/2006 | Iwema et al. |
| 2006/0210958 A1 | 9/2006 | Rimas-Ribikauskas |
| 2006/0218573 A1 | 9/2006 | Proebstel |
| 2006/0239558 A1 | 10/2006 | Rafii et al. |

(56) References Cited

U.S. PATENT DOCUMENTS

| | | |
|---|---|---|
| 2006/0253793 A1 | 11/2006 | Zhai et al. |
| 2006/0262116 A1 | 11/2006 | Moshiri et al. |
| 2006/0271207 A1 | 11/2006 | Shaw |
| 2006/0280055 A1 | 12/2006 | Miller et al. |
| 2006/0282856 A1 | 12/2006 | Errico et al. |
| 2006/0282859 A1 | 12/2006 | Garbow et al. |
| 2007/0013718 A1 | 1/2007 | Ohba |
| 2007/0018973 A1 | 1/2007 | Shih et al. |
| 2007/0060336 A1 | 3/2007 | Marks et al. |
| 2007/0075978 A1 | 4/2007 | Chung |
| 2007/0098222 A1 | 5/2007 | Porter et al. |
| 2007/0140532 A1 | 6/2007 | Goffin |
| 2007/0143715 A1 | 6/2007 | Hollins et al. |
| 2007/0143787 A1 | 6/2007 | Cankaya |
| 2007/0150281 A1 | 6/2007 | Hoff |
| 2007/0150916 A1 | 6/2007 | Begole et al. |
| 2007/0203685 A1 | 8/2007 | Takano |
| 2007/0214292 A1 | 9/2007 | Hayes et al. |
| 2007/0216894 A1 | 9/2007 | Garcia et al. |
| 2007/0219430 A1 | 9/2007 | Moore |
| 2007/0260984 A1 | 11/2007 | Marks et al. |
| 2007/0271580 A1 | 11/2007 | Tischer et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0016544 A1 | 1/2008 | Lee et al. |
| 2008/0018591 A1 | 1/2008 | Pittel et al. |
| 2008/0026838 A1 | 1/2008 | Dunstan et al. |
| 2008/0027984 A1 | 1/2008 | Perdomo |
| 2008/0033790 A1 | 2/2008 | Nickerson et al. |
| 2008/0059578 A1 | 3/2008 | Albertson et al. |
| 2008/0062257 A1 | 3/2008 | Corson |
| 2008/0065243 A1 | 3/2008 | Fallman et al. |
| 2008/0081694 A1 | 4/2008 | Hong et al. |
| 2008/0091512 A1 | 4/2008 | Marci et al. |
| 2008/0092159 A1 | 4/2008 | Dmitriev et al. |
| 2008/0100620 A1 | 5/2008 | Nagai et al. |
| 2008/0100825 A1 | 5/2008 | Zalewski |
| 2008/0124690 A1 | 5/2008 | Redlich |
| 2008/0126937 A1 | 5/2008 | Pachet |
| 2008/0134102 A1 | 6/2008 | Movold et al. |
| 2008/0151113 A1 | 6/2008 | Park |
| 2008/0152191 A1 | 6/2008 | Fujimura et al. |
| 2008/0163130 A1 | 7/2008 | Westerman |
| 2008/0163283 A1 | 7/2008 | Tan et al. |
| 2008/0178126 A1 | 7/2008 | Beeck |
| 2008/0215972 A1 | 9/2008 | Zalewski et al. |
| 2008/0215973 A1 | 9/2008 | Zalewski et al. |
| 2008/0234023 A1 | 9/2008 | Mullahkhel et al. |
| 2008/0310707 A1 | 12/2008 | Kansal et al. |
| 2009/0013366 A1 | 1/2009 | You et al. |
| 2009/0025024 A1 | 1/2009 | Beser et al. |
| 2009/0027337 A1 | 1/2009 | Hildreth |
| 2009/0037945 A1 | 2/2009 | Greig et al. |
| 2009/0051648 A1 | 2/2009 | Shamaie et al. |
| 2009/0070798 A1 | 3/2009 | Lee et al. |
| 2009/0072992 A1 | 3/2009 | Yun |
| 2009/0073136 A1 | 3/2009 | Choi |
| 2009/0085864 A1 | 4/2009 | Kutliroff et al. |
| 2009/0089225 A1 | 4/2009 | Baier et al. |
| 2009/0094627 A1 | 4/2009 | Lee et al. |
| 2009/0094628 A1 | 4/2009 | Lee et al. |
| 2009/0094629 A1 | 4/2009 | Lee et al. |
| 2009/0094630 A1 | 4/2009 | Brown |
| 2009/0106645 A1 | 4/2009 | Knobel |
| 2009/0112817 A1 | 4/2009 | Jung et al. |
| 2009/0116684 A1 | 5/2009 | Andreasson |
| 2009/0133051 A1 | 5/2009 | Hildreth |
| 2009/0141933 A1 | 6/2009 | Wagg |
| 2009/0146775 A1 | 6/2009 | Bonnaud et al. |
| 2009/0157472 A1 | 6/2009 | Burazin et al. |
| 2009/0167679 A1 | 7/2009 | Klier et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0183220 A1 | 7/2009 | Amento |
| 2009/0195392 A1 | 8/2009 | Zalewski |
| 2009/0217315 A1 | 8/2009 | Malik et al. |
| 2009/0221368 A1 | 9/2009 | Yen et al. |
| 2009/0234718 A1 | 9/2009 | Green |
| 2009/0235195 A1 | 9/2009 | Shin et al. |
| 2009/0251425 A1 | 10/2009 | Sohn et al. |
| 2009/0252423 A1 | 10/2009 | Zhu et al. |
| 2009/0259960 A1 | 10/2009 | Steinle et al. |
| 2009/0296002 A1 | 12/2009 | Lida et al. |
| 2009/0303231 A1 | 12/2009 | Robinet et al. |
| 2009/0320055 A1 | 12/2009 | Langille et al. |
| 2009/0327977 A1 | 12/2009 | Bachfischer et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0070913 A1 | 3/2010 | Murrett et al. |
| 2010/0070987 A1 | 3/2010 | Amento et al. |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0095332 A1 | 4/2010 | Gran et al. |
| 2010/0107184 A1* | 4/2010 | Shintani .......................... 725/10 |
| 2010/0122286 A1 | 5/2010 | Begeja et al. |
| 2010/0138780 A1 | 6/2010 | Marano et al. |
| 2010/0138797 A1 | 6/2010 | Thorn |
| 2010/0138798 A1 | 6/2010 | Wilson et al. |
| 2010/0146389 A1 | 6/2010 | Yoo et al. |
| 2010/0151946 A1 | 6/2010 | Wilson et al. |
| 2010/0153856 A1 | 6/2010 | Russ |
| 2010/0153984 A1 | 6/2010 | Neufeld |
| 2010/0169157 A1 | 7/2010 | Muhonen et al. |
| 2010/0169905 A1 | 7/2010 | Fukuchi et al. |
| 2010/0191631 A1 | 7/2010 | Weidmann |
| 2010/0207874 A1 | 8/2010 | Yuxin et al. |
| 2010/0207875 A1 | 8/2010 | Yeh |
| 2010/0211439 A1 | 8/2010 | Marci et al. |
| 2010/0235667 A1 | 9/2010 | Mucignat et al. |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0271802 A1 | 10/2010 | Recker et al. |
| 2010/0278393 A1 | 11/2010 | Snook et al. |
| 2010/0286983 A1 | 11/2010 | Cho |
| 2010/0295782 A1 | 11/2010 | Binder |
| 2010/0295783 A1 | 11/2010 | El Dokor et al. |
| 2010/0306712 A1 | 12/2010 | Snook et al. |
| 2010/0327766 A1 | 12/2010 | Recker et al. |
| 2010/0332842 A1 | 12/2010 | Kalaboukis et al. |
| 2011/0007142 A1 | 1/2011 | Perez et al. |
| 2011/0016102 A1 | 1/2011 | Hawthorne et al. |
| 2011/0026765 A1 | 2/2011 | Ivanich |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0084983 A1 | 4/2011 | Demaine |
| 2011/0085705 A1 | 4/2011 | Izadi et al. |
| 2011/0115887 A1 | 5/2011 | Yoo et al. |
| 2011/0126154 A1 | 5/2011 | Boehler et al. |
| 2011/0145040 A1 | 6/2011 | Zahn et al. |
| 2011/0145041 A1 | 6/2011 | Salamatov et al. |
| 2011/0157009 A1 | 6/2011 | Kim et al. |
| 2011/0161912 A1 | 6/2011 | Eteminan et al. |
| 2011/0164143 A1 | 7/2011 | Shintani et al. |
| 2011/0173589 A1 | 7/2011 | Guttman et al. |
| 2011/0208582 A1 | 8/2011 | Hoyle |
| 2011/0214141 A1 | 9/2011 | Oyaizu |
| 2011/0216059 A1 | 9/2011 | Espiritu et al. |
| 2011/0246572 A1 | 10/2011 | Kollenkark et al. |
| 2011/0254859 A1 | 10/2011 | Matsuda |
| 2011/0263946 A1 | 10/2011 | el Kaliouby et al. |
| 2011/0264531 A1 | 10/2011 | Bhatia et al. |
| 2011/0282745 A1 | 11/2011 | Meoded et al. |

(56) References Cited

U.S. PATENT DOCUMENTS

| | | | |
|---|---|---|---|
| 2011/0316845 A1 | 12/2011 | Roberts et al. | |
| 2011/0321096 A1 | 12/2011 | Landow et al. | |
| 2012/0005632 A1 | 1/2012 | Broyles, III et al. | |
| 2012/0011530 A1 | 1/2012 | Bentolila et al. | |
| 2012/0030637 A1 | 2/2012 | Dey et al. | |
| 2012/0047525 A1* | 2/2012 | Campagna et al. | 725/16 |
| 2012/0051719 A1* | 3/2012 | Marvit | 386/285 |
| 2012/0060176 A1* | 3/2012 | Chai et al. | 725/10 |
| 2012/0079521 A1 | 3/2012 | Garg et al. | |
| 2012/0084812 A1 | 4/2012 | Thompson et al. | |
| 2012/0105257 A1 | 5/2012 | Murillo et al. | |
| 2012/0105473 A1 | 5/2012 | Bar-Zeev et al. | |
| 2012/0109726 A1 | 5/2012 | Ruffini | |
| 2012/0124603 A1 | 5/2012 | Amada | |
| 2012/0192233 A1 | 7/2012 | Wong | |
| 2012/0209715 A1 | 8/2012 | Lotan et al. | |
| 2012/0226981 A1 | 9/2012 | Clavin | |
| 2012/0268362 A1 | 10/2012 | Yee | |
| 2012/0280897 A1 | 11/2012 | Balan et al. | |
| 2012/0290508 A1 | 11/2012 | Bist | |
| 2012/0304059 A1 | 11/2012 | McCloskey | |
| 2012/0304206 A1 | 11/2012 | Roberts et al. | |
| 2012/0306734 A1 | 12/2012 | Kim et al. | |
| 2013/0007671 A1 | 1/2013 | Hammontree et al. | |
| 2013/0014144 A1 | 1/2013 | Bhatia et al. | |
| 2013/0054652 A1 | 2/2013 | Antonelli et al. | |
| 2013/0117771 A1 | 5/2013 | Lee et al. | |
| 2013/0136358 A1 | 5/2013 | Dedhia et al. | |
| 2013/0145384 A1 | 6/2013 | Krum | |
| 2013/0145385 A1 | 6/2013 | Aghajanyan | |
| 2013/0159555 A1 | 6/2013 | Rosser | |
| 2013/0198690 A1 | 8/2013 | Barsoum et al. | |
| 2013/0232515 A1 | 9/2013 | Rivera et al. | |
| 2013/0268955 A1 | 10/2013 | Conrad | |
| 2013/0298146 A1 | 11/2013 | Conrad | |
| 2013/0298158 A1 | 11/2013 | Conrad | |
| 2014/0109121 A1 | 4/2014 | Krum | |
| 2014/0247212 A1 | 9/2014 | Kim | |

FOREIGN PATENT DOCUMENTS

| | | |
|---|---|---|
| CN | 101095055 | 12/2007 |
| CN | 101202994 | 6/2008 |
| CN | 101254344 | 6/2010 |
| CN | 102713788 | 10/2012 |
| EP | 0583061 | 2/1994 |
| EP | 1315375 | 5/2003 |
| GB | 2423808 | 6/2006 |
| GB | 2459707 A | 11/2009 |
| JP | 08044490 | 2/1996 |
| WO | WO-9310708 | 6/1993 |
| WO | WO-9717598 | 5/1997 |
| WO | WO-9915863 | 4/1999 |
| WO | WO-9944698 | 9/1999 |
| WO | WO-0159975 | 8/2001 |
| WO | WO-0163916 | 8/2001 |
| WO | WO-0169799 | 9/2001 |
| WO | WO-02082249 | 10/2002 |
| WO | WO-03001722 | 1/2003 |
| WO | WO-03015056 | 2/2003 |
| WO | WO-03046706 | 6/2003 |
| WO | WO-03054683 | 7/2003 |
| WO | WO-03071410 | 8/2003 |
| WO | WO-03073359 | 9/2003 |
| WO | WO-2007128507 | 11/2007 |
| WO | WO-2008001287 | 1/2008 |
| WO | WO-2009059065 | 5/2009 |
| WO | WO-2011069035 | 6/2011 |

OTHER PUBLICATIONS

"Foreign Office Action", Canadian Application No. 2775700, (Aug. 24, 2012), 2 pages.
"Future Media Internet Research Challenges and the Road Ahead", Retrieved at <<http://www.gatv.ssr.upm.es/nextmedia/images/fmi-tf-white_paper_042010.pdf>>, Apr. 2010, pp. 31.
Minge, Michael, "Dynamics of User Experience", Retrieved at <<http://www.cs.uta.fi/~ux-emotion/submissions/Minge.pdf>>, Workshop on Research Goals and Strategies for Studying User Experience and Emotion, 2008, pp. 5.
"Advisory Action", U.S. Appl. No. 10/396,653, (May 2, 2007), 3 pages.
"Advisory Action", U.S. Appl. No. 10/396,653, (May 23, 2008), 3 pages.
"Affdex: Measuring Emotion over the Web", *Affectiva*, Retrieved from: <http://www.affectiva.com/affdex/> on Nov. 4, 2011, 3 pages.
"Application Titled "Controlling Electronic Devices in a Multimedia System Through a Natural User Interface"", U.S. Appl. No. 13/038,024, filed Mar. 2, 2011, pp. 1-46.
"Application Titled "Interaction with Networked Screen Content Via Motion Sensing Device in Retail Setting"", U.S. Appl. No. 13/025,180, filed Feb. 11, 2011, pp. 1-23.
"Commanding Overview", *MSDN*, retrieved from <http://msdn.microsoft.com/en-us/library/ms752308.aspx> on Sep. 27, 2011, 11 pages.
"Designing CEC into your next HDMI Product", *Quantum Data White Paper*, Retrieved from the Internet:<URL:http://www.quantumdata.com/pdf/CEC_white_paper.pdf> *Quantum Data, Inc.*, Elgin, IL, USA, (May 13, 2006), 12 pages.
"Final Office Action", U.S. Appl. No. 10/396,653, (Feb. 20, 2009), 12 pages.
"Final Office Action", U.S. Appl. No. 10/396,653, (Feb. 25, 2008), 20 pages.
"Final Office Action", U.S. Appl. No. 10/396,653, (Feb. 26, 2007), 18 pages.
"Final Office Action", U.S. Appl. No. 11/626,794, (Jun. 11, 2009), 14 pages.
"Final Office Action", U.S. Appl. No. 12/474,453, (May 10, 2012), 14 pages.
"GWindows: Light-Weight Stereo Vision for Interaction", http://research.microsoft.com/~nuria/gwindows/htm, (Jul. 8, 2005), 2 pages.
"International Search Report", PCT Application No. PCT/US2010/036005, (Dec. 24, 2010), 3 pages.
"KinEmote uses Kinect to translate key strokes for Windows applications", techshout.com [online], Retrieved from the Internet:<URL:http://www.techshout.com/gaming/2010/28/kinemote-uses-kinect-to-translate-key-strokes-for-windows-applications/>, (Dec. 28, 2010), 2 pages.
"Non-Final Office Action", U.S. Appl. No. 10/396,653, (Sep. 6, 2007), 17 pages.
"Non-Final Office Action", U.S. Appl. No. 10/396,653, (Sep. 8, 2008), 13 pages.
"Non-Final Office Action", U.S. Appl. No. 10/396,653, (Sep. 19, 2006), 24 pages.
"Non-Final Office Action", U.S. Appl. No. 11/626,794, (Oct. 27, 2009), 15 pages.
"Non-Final Office Action", U.S. Appl. No. 11/626,794, (Dec. 23, 2008), 18 pages.
"Non-Final Office Action", U.S. Appl. No. 12/474,453, (Sep. 6, 2011), 10 pages.
"Notice of Allowance", U.S. Appl. No. 10/396,653, (Nov. 19, 2009), 7 pages.
"Notice of Allowance", U.S. Appl. No. 11/626,794, (May 13, 2010), 4 pages.
"Signal Processing Institute", http://ltswww.epfl.ch/~alahi/student_projects/proposals.shtml#4, Downloaded Feb. 2, 2009, 4 pages.
"Simulation and Training", Division Incorporated, (1994), 6 Pages.
"The Case for Kinect", *Eurogamer* [online] Retrieved from the Internet on Aug. 20, 2010: URL:<http://www.eurogamer.net/articles/digitalfoundry-the-case-for-kinect-article?page=2>., (Aug. 7, 2010), pp. 1-7.
"U.S. Appl. No. 12/794,406", filed Jun. 4, 2010, 37 pages.
"Virtual High Anxiety", *Tech update*, (Aug. 1995), 1 Page.
Agarwal, Ankur et al., "High Precision Multi-touch Sensing on Surfaces using Overhead Cameras", *Second Annual IEEE International Workshop on Horizontal Interactive Human-Computer System,*

(56) References Cited

OTHER PUBLICATIONS available at <<http://ieeexplore.ieee.org/stamp/stamp.jsp?tp=&arnumber=4384130>>,(Nov. 19, 2007),4 pages.

Aggarwal, et al., "Human Motion Analysis: A Review", *IEEE Nonrigid and Articulated motion Workshop*, University of Texas at Austin, Austin, TX.,(1997),pp. 90-102.

Ali, Azarbayejani et al., "Real-Time Self-Calibrating Stereo Person Tracking Using 3-D Shape Estimation from Blob Features", *Proceedings of ICPR*, Vienna, Austria, (Aug. 1996),pp. 627-632.

Althoff, Frank et al., "Using Multimodal Interaction to Navigate in Arbitrary Virtual VRML Worlds", *PUI 2001* Orlando, FL USA, available at <http://citeseerx.ist.psu.edu/viewdoc/download?doi=10.1.1.16.8034&rep=rep1&type=pdf>,(2001),8 pages.

Argyros, et al., "Vision-Based Interpretation of Hand Gestures for Remote Control of a Computer Mouse", Retrieved from: <http://www.ics.forth.gr/~argyros/mypapers/2006_05_hci_virtualmouse.pdf> on Oct. 31, 2007, (2006),pp. 40-51.

Azarbayejani, et al., "Visually Controlled Graphics", *IEEE Transactions on Pattern Analysis and Machine Intelligence*, vol. 15, No. 6, (Jun. 1993),pp. 602-605.

Azoz, Yusuf et al., "Reliable Tracking of Human Arm Dynamics by Multiple Cue Integration and Constraint Fusion", *IEEE Conference on Computer Vision and Pattern Recognition*, (1998),6 pages.

Baudel, Thomas et al., "Charade: Remote Control of Objects using Free-Hand Gestures", *Communications of the ACM*, vol. 36. No. 7, (Jul. 1993),10 pages.

Becker, David A., "Sensei: A Real-Time Recognition, Feedback and Training System for T'ai Chi Gestures", http://citeseer.ist.psu.edu/cache/papers/cs/405/ftp:zSzzSzwhitechapel.media.mit.eduzSzpubzSztech-reporterzsSzTR-426pdf/becker97sensei.pdf, (Jun. 1993),50 pages.

Berard, Francois "The Perceptual Window-Head Motion as a New Input Stream", *Proceedings of the Seventh IFIP Conference of Human-Computer Interaction*, (1999),238-244.

Bhuiyan, Moniruzzaman et al., "Gesture-controlled user interfaces, what have we done and what's next?", Retrieved at <<http://www.newi.ac.uk/computing/research/pubs/SEIN_BP.pdf>>, (Nov. 27, 2009),10 pages.

Bobic, Nick "Rotating Objects Using Quaternions", Retrieved from the Internet on Aug. 20, 2010: URL http://www.gamasutra.com/view/feature/3278/rotating_objects_quaternions.php?page=2>., (Jul. 5, 1998),14 pages.

Boverie, S. et al., "Comparison of Structured Light and Stereovision Sensors for New Airbag Generations", *Control Engineering Practice* vol. 11, Issue 12 (2003), available at <<http://homepages.laas.fr/lerasle/pdf/cep03.pdf>>,(Dec. 2003),pp. 1413-1421.

Bowman, Doug A., et al., "New Directions in 3D User Interfaces", *The International Journal of Virtual Reality*, retrieved from <http://citeseerx.ist.psu.edu/viewdoc/download?doi=10.1.1.99.1121&rep=rep1&type=pdf> on Nov. 15, 2011,(2006),pp. 3-14.

Breen, David et al., "Interactive Occlusion and Collision of Real and Virtual Objects in Augmented Reality", *Technical report ECRC-95-02 European Computer-Industry Research Centre GmbH*, Munich, Germany, (1995),22 Pages.

Brogan, David et al., "Dynamically Simulated Characters in Virtual Environments", vol. 18, Issue 5, *IEEE Computer Graphics and Applications*, (Sep./Oct. 1998),pp. 58-69.

Buxton, William et al., "A Study of Two-Handed Input", *Proceedings of CHI'86*,(1986),pp. 321-326.

Cedras, Claudette et al., "Motion-based Recognition: A Survey", *IEEE Proceedings, Image and Vision Computing*, vol. 13, No. 2, (Mar. 1995),pp. 129-155.

Crawford, Stephanie "How Microsoft Kinect Works", *Howstuffworks*[online] Retrieved from the Internet on Aug. 19, 2010: URL: <http://electronics.howstuffworks.com/microsoft-kinect.htm/printable>., pp. 1-5.

Dalton, Angela B., et al., "Sensing User Intention and Context for Energy Management", *Duke University, Department of Computer Science*, Retrieved from the Internet:<URL:http://www.cs.duke/edu/ari/millywatt/faceoff.pdf>, (Feb. 23, 2003),5 pages.

Darrell, T et al., "Integrated Person Tracking Using Stereo, Color and Pattern Detection", *Proceedings of the Conference on Computer Vision and Pattern Recognition*, (1998),pp. 601-609.

Fisher, et al., "Virtual Environment Display System", *ACM Workshop on Interactive 3D Graphics*, Chapel Hill, NC, (Oct. 1986),12 Pages.

Fitzgerald, et al., "Integration of Kinematic Analysis into Computer Games for Exercise", *Proceedings of CGames 2006—9th International Conference on Computer Games: AI, Animation, Mobile, Educational and Serious Games*, Dublin Ireland, (Nov. 2006),pp. 24-28.

Fitzgerald, Will et al., "Multimodal Event Parsing for Intelligent User Interfaces", *IUI Conference*, (Jan. 2003),8 pages.

Freed, Natalie "Toys Keeping in Touch: Technologies for Distance Play", Retrieved from <<http://people.ischool.berkeley.edu/~daniela/tei2010/gsc09e-freed.pdf>>, (Jan. 24, 2010),2 pages.

Freeman, William et al., "Television Control by Hand Gestures", *International Workshop on Automatic Face and Gesture Recognition*, (1995),pp. 179-183.

Gonzalez, Barb "HDMI CEC", *Home Theater University* [online] Retrieved from the Internet:<URL:http://www.hometheatre.com/hookmeup/208hook>, (Mar. 24, 2008),3 pages.

Granieri, John P., et al., "Simulating Humans in VR", *The British Computer Society, Academic Press*, (Oct. 1994),15 Pages.

Grunder, Alexander "Updated: Xbox 360 Kinect Hand Gesture Media Controls, Voice Control, TV Video Chat.", *eHomeUpgrade* [online] retrieved from the internet:<URL:http://www.ehomeupgrade.com/2010/06/14/updated-xbox-360-kinect-hand-gesture-media-controls-voice-control-tv-video-chat/>, (Jun. 14, 2010),8 pages.

Guiard, Yves "Asymmetric Division of Labor in Human Skilled Bimanual Action: The Kinematic Chain as a Model", *Journal of Motor Behavior*, vol. 19 Issue 4, (1987),486-517.

Guler, Sadiye Z., "Split and Merge Behavior Analysis and Understanding Using Hidden Markov Models", (Oct. 8, 2002),21 pages.

Hardin, Winn "Machine Vision Makes the Leap to Consumer Gaming", *Machine Vision Online*, retrieved from <<http://www.machinevisiononline.org/vision-resources-details.cfm?content_id=2398>> on Mar. 14, 2011,(Dec. 8, 2010),3 pages.

Hasegawa, Shoichi et al., "Human-Scale Haptic Interaction with a Reactive Virtual Human in a Real-Time Physics Simulator", *ACM Computers in Entertainment*, vol. 4, No. 3, (Jul. 2006),12 Pages.

He, Lei "Generation of Human Body Models", *University of Auckland*, New Zealand (Apr. 2005),111 Pages.

Hongo, Hitoshi et al., "Focus of Attention for Face and Hand Gesture Recognition Using Multiple Cameras", *4th IEEE International Conference on Automatic Face and Gesture Recognition*, Grenoble, France, (Mar. 2000),pp. 156-161.

Horvitz, Eric "Principles of Mixed-Initiative User Interfaces", *Proceedings of CHI*, (1999),8 pages.

Horvitz, Eric et al., "A Computational Architecture for Conversation", *Proceedings of the Seventh International Conference on User Modeling*, (1999),pp. 201-210.

Hourcade, Juan P., "Architecture and Implementation of Java Package for Multiple Input Devices (MID)", *HCIL Technical Report No. 99-08* (May 1999); http://www.cs.umd.edu/hcil, (May 1999),7 pages.

Isard, Michael et al., "Condensation—Conditional Density Propagation for Visual Tracking", *International Journal of Computer Vision* 29(1), Netherlands, (1998),pp. 5-28.

Jacko, "HDI Dune Prime 3.0 Part 2.", Retrieved from the internet: <URL:http://www.jacko.my/2010/06/hdi-dune-prime-30-part-2.html>, (Jun. 19, 2010),15 pages.

Jojic, Nebojsa et al., "Detection and Estimation of Pointing Gestures in Dense Disparity Maps", *Proceedings of IEEE International Conference on Automatic Face and Gesture Recognition*, (2000),pp. 1000-1007.

Kabbash, P et al., "The "Prince" Technique: Fitts' Law and Selection Using Area Cursors", *Proceedings of CHI'95*, http://www.billbuxton.com/prince.html, (1995),pp. 273-279.

Kanade, et al., "Development of Video-Rate Stereo Machine", *Proceedings of 94 ARPA Image Understanding Workshop*, (1994),pp. 549-558.

(56) References Cited

OTHER PUBLICATIONS

Kanade, Takeo et al., "A Stereo Machine for Video-rate Dense Depth Mapping and Its New Applications", *IEEE Computer Society Conference on Computer Vision and Pattern Recognition*, The Robotics Institute, Carnegie Mellon University, Pittsburgh, PA,(1996),pp. 196-202.

Kim, Song-Gook et al., "Multi-Touch Tabletop Interface Technique for HCI", retrieved from <<http://210.119.33.7/apis6/paper/data/63-multi-touch%20tabl.pdf>> on Mar. 16, 2011,4 pages.

Kjeldsen, Frederik "Visual Interpretation of Hand Gestures as Practical Interface Modality", *Ph.D. Dissertation, Columbia University Department of Computer Science*, (1997),168 pages.

Klompmaker, Florian "D5.1—State of the art analysis and recommendations on 'Context Awareness', 'Human Computer Interaction' and 'Mobile Users Interfaces'", *Information Technology for European Advancement (ITEA), Local Mobile Services*, Retrieved from the Internet:<URL:http://www.loms-itea.org/deliverables/LOMS_D5.1_v1.0.pdy>, (Jul. 2, 2007),55 pages.

Kohler, Marcus "Technical Details and Ergonomical Aspects of Gesture Recognition applied in Intelligent Home Environments", Germany, (1997),35 Pages.

Kohler, Markus "Special Topics of Gesture Recognition Applied in Intelligent Home Environments", *In Proceedings of the Gesture Workshop*, Germany, (1998),12 Pages.

Kohler, Markus "Vision Based Remote Control in Intelligent Home Environments", *University of Erlangen-Nuremberg*, Germany, (1996),8 Pages.

Kolsch, Mathias et al., "Vision-Based Interfaces for Mobility", Retrieved from <<http://ieeexplore.ieee.org/stamp/stamp.jsp?tp=&arnumber=1331713>>, (Aug. 22, 2004),9 pages.

Kwon, et al., "Combining Body Sensors and Visual Sensors for Motion Training", *Computer Graphics Laboratory*, http://graphics.ethz.ch/~dkwon/downloads/publications/ace05_ace.pdf, Downloaded 2009,(2005),pp. 1-8.

Latoschik, Marc E., "A User Interface Framework for Multimodal VR Interactions", *ICMI'05*, Trento, Italy, Oct. 4-6, 2005, available at <http://citeseerx.ist.psu.edu/viewdoc/download?doi=10.1.1.91.2941&rep=rep1&type=pdf>,(Oct. 4, 2005),8 pages.

Le, Nguyen T., "EmuPlayer: Music Recommendation System Based on User Emotion Using Vital-sensor", *Thesis, Keio University*, Available at <http://www.sfc.wide.ad.jp/thesis/2011/files/sunny-publish-thesis.pdf>,(2010),85 pages.

Leal, Anamary et al., "Initial Explorations into the User Experience of 3D File Browsing", *Proceedings of HCI 2009*, retrieved from <http://www.eecs.ucf. edu/isuelab/publications/pubs/p339-leal-3dfiles.pdf> on Nov. 15, 2011,(Sep. 2009),pp. 339-344.

Li, Stan Z., et al., "A Near-Infrared Image Based Face Recognition System", available at <<http://www.cbsr.ia.ac.cn/Li%20Group/papers/IR-Face-FG06.pdf>>,(Apr. 2006),6 pages.

Livingston, Mark A., "Vision-based Tracking with Dynamic Structured Light for Video See-through Augmented Reality", *TheUniversity of NorthCarolina at ChapelHill*, North Carolina, USA, (1998),145 Pages.

Long, Jr., Allan C., et al., "Implications for a Gesture Design Tool", *Proceedings of CHI'99*, (1999),pp. 40-47.

Maes, Pattie et al., "The Alive System: Wireless, Full-body, Interaction with Autonomous Agents", *ACM Multimedia Systems, Special Issue on Multimedia and Multisensory Virtual Worlds*, (Nov. 1995),17 pages.

Maltby, John R., "Using Perspective in 3D File Management: Rotating Windows and Billboarded Icons", *Proceedings of the International Conference on Computer Graphics, Imaging and Visualisation (CGIV'06)*, available at <http://ieeexplore.ieee.org/stamp/stamp.jsp?tp=&arnumber=1663764>,(Jul. 28, 2006),8 pages.

Martin, Benoit "VirHKey: A VIRtual Hyperbolic KEYboard with Gesture Interaction and Visual Feedback for Mobile Devices", http://delivery.acm.org/10.1145/1090000/1085794/p99-martin.pdf?key1=1085794&key2=4890534611&coll=portal&dl=ACM&CFID=11111111&CFTOKEN=2222222, (Sep. 2005),8 pages.

McCrae, James et al., "Exploring the Design Space of Multiscale 3D Orientation", *AVI '10*, retrieved from <http://www.autodeskresearch.com/pdf/avi2010-final.pdf> on Nov. 15, 2011,(May 29, 2010),8 pages.

Mignot, Christopher et al., "An Experimental Study of Future 'Natural' Multimodal Human-Computer Interaction", *Proceedings of INTERCHI93*, (1993),pp. 67-68.

Millan, Maria S., et al., "Unsupervised Defect Segmentation of Patterned Materials under NIR Illumination", *Journal of Physics: Conference Series 274* (2011) 012044, available at <<http://iopscience.iop.org/1742-6596/274/1/012044/pdf/1742-6596_274_1_012044.pdf>>,(2011),9 pages.

Miyagawa, Ryohei et al., "CCD-Based Range-Finding Sensor", *IEEE Transactions on Electron Devices*, vol. 44, No. 10, (Oct. 1997),pp. 1648-1652.

Moeslund, Thomas B., et al., "A Survey of Computer Vision-Based Human Motion Capture", *Computer Vision and Image Understanding: CVIU*, vol. 81, No. 3, (2001),pp. 231-269.

Morency, Louis-Philippe et al., "Contextual Recognition of Head Gestures", Trento, Italy http://delivery.acm.org/10.1145/1090000/1088470/p18_morency.pdf?key1=1088470&key2=8870534611&coll=portal&dl=ACM&CFID=11111111&CFTOKEN=2222222, 7 pages.

Morrison, Gerald D., "A Camera-Based Touch Interface for Pervasive Displays", Retrieved from <<http://ubicomp.algoritmi.uminho.pt/perdisplay/docs/Morrison-Camera%20Touch_SV_Rev1.pdf>> on Mar. 16, 2011,7 pages.

Moscovich, Tomer "Multi-touch Interaction", *Brown University, CHI 2006*, Apr. 22-27, 2006, Montreal, Quebec, Canada, (Apr. 22, 2006),4 pages.

Moyle, et al., "Gesture Navigation: An Alternative 'Back' for the Future", *Proceedings of CHI'02*, (2002),pp. 882-823.

Nielsen, Michael et al., "A Procedure for Developing Intuitive and Ergonomic Gesture Interfaces for Man-Machine Interaction", Technical Report CVMT 03-01, ISSN 1601-3646. *CVMT*, Aalborg University, (Mar. 2003),12 pages.

Oh, Alice et al., "Evaluating Look-to-talk: A Gaze-Aware Interface in a Collaborative Environment", *CHI'02* (2002),650-651.

Oviatt, Sharon "Ten Myths of Multimodal Interaction", *Communications of the ACM*. vol. 42, No. 11, (Nov. 1999),8 pages.

Paquit, Vincent et al., "Near-Infrared Imaging and Structured Light Ranging for Automatic Catheter Insertion", *Proceedings of SPIE* vol. 6141, 61411T,(2006), available at <<http://www.cs.rpi.edu/~chakrn2/work/catheter_plan/paguit_06.pdf>>,(2006),9 pages.

Parrish, Kevin "Microsoft Does Want Core Games, FPS for Kinect", *Tom's Guide: Tech for Real Life* [online], Retrieved from the Internet on Aug. 20, 2010: URL: <http://www.tomsguide.com/us/Core-Gamers-Kinect-FPS-Action.news-7195.html>., (Jun. 23, 2010),1 page.

Pavlou, Paul A., et al., "Measuring the Effects and Effectiveness of Interactive Advertising: A Research Agenda", *Journal of Interactive Advertising*, vol. 1, No. 1 (Fall 2000), Available at <http://scholar.google.co.in/scholar_url?hl=en&q=http://jiad.org/download%3Fp%3D6&sa=X&scisig=AAGBfm3He5PA4sgMGDXTyQuqaVQn4Q3nZw&oi=scholarr>,(Oct. 2000),pp. 62-78.

Pavlovic, Vladimir et al., "Visual Interpretation of Hand Gestures for Human-Computer Interaction: A Review", *IEEE Transactions on Pattern Analysis and Machine Intelligence*, vol. 19, No. 7, (Jul. 1997),pp. 667-695.

Qian, et al., "A Gesture-Driven Multimodal Interactive Dance System", *IEEE International Conference on Multimedia and Expo*, Taipei, (Jun. 2004),pp. 1579-1582.

Raymer, A "Gestures and Words: Facilitating Recovery in Aphasia", *The ASHA Leader*, http://www.asha.org/about/publications/leader-online/archives/2007/070619/f070619a.htm, (Jun. 19, 2007),6 pages.

Rigoll, Gerhard et al., "High Performance Real-Time Gesture Recognition Using Hidden Markov Models", *Gesture and Sign Language in Human-Computer Interaction*, vol. LNAI 1371, Frohlich, ed., (1997),pp. 69-80.

Rosenhahn, Bodo et al., "Automatic Human Model Generation", *University of Auckland (CITR)*, New Zealand, (2005),pp. 41-48.

(56) References Cited

OTHER PUBLICATIONS

Sakir, Samit "Kinect is your personal trainer in EA Sports Active 2", *Gamerss* [online] Retrieved from the Internet on Aug. 20, 2010: URL:<http://www.gamerss.co.uk/kinect-is-your-personal-trainer-in-ea-sports-active-2>., (Jul. 26, 2010),4 pages.

Schick, Alexander et al., "Extending Touch: Towards Interaction with Large-Scale Surfaces", *ITS '09*, Nov. 23-25, 2009, Banff, Alberta, Canada, available at <<http://www.iosb.fraunhofer.de/servlet/is/33404/urn_nbn_de_0011-n-1159494.pdf>>,(Nov. 23, 2009),8 pages.

Schielel, Seth "A Home System Leaves Hand Controls in the Dust, Kinect by Microsoft Keeps You Entertained Hands Free", *The New York Times* [online] Retrieved from the Internet:<URL:http://www.nytimes.com/2010/11/04/arts/television/04kinect.html>, (Nov. 4, 2010),3 pages.

Shao, Jiang et al., "An Open System Architecture for a Multimedia and Multimodal User Interface", *Japanese Society for Rehabilitation of Persons with Disabilities (JSRPD)*, Japan, (Aug. 24, 1998),8 Pages.

Sharma, et al., "Method of Visual and Acoustic Signal Co-Analysis for Co-Verbal Gesture Recognition", U.S. Appl. No. 60/413,998, (Sep. 19, 2002),16 pages.

Sharma, Rajeev M., et al., "Speech-Gesture Driven Multimodal Interfaces for Crisis Management", *Proceedings of IEEE Special Issue on Mulitmodal Human-Computer Interface*, (2003),28 pages.

Shen, Guobin et al., "Dita: Enabling Gesture-Based Human-Device Interaction using Mobile Phone", Retrieved at <<:http://research.microsoft.com/en-us/people/jackysh/dita.pdf>>, (Oct. 1, 2010),pp. 1-14.

Sheridan, Thomas et al., "Virtual Reality Check", *Technology Review*, vol. 96, No. 7, (Oct. 1993),9 Pages.

Shivappa, et al., "Person Tracking with Audio-Visual Cues Using the Iterative Decoding Framework", *IEEE Fifth International Conference on Advanced Video and Signal Based Surveillance, AVSS 08*, Santa Fe, NM, (Sep. 2008),260-267.

Simeone, Luca et al., "Toys++ AR Embodied Agents as Tools to Learn by Building", Retrieved from <<http://ieeexplore.ieee.org/stamp/stamp.jsp?arnumber=05572598>>, (Jul. 5, 2010),2 pages.

Stevens, Jane "Flights into Virtual Reality Treating Real World Disorders", *The Washington Post, Science Psychology*, (Mar. 27, 1995),2 Pages.

Tep, S. P., et al., "Web Site Quality Evaluation Combining Eyetracking and Physiologicial Measures to Self-Reported Emotions: An Exploratory Research", *Proceedings of Measuring Behavior 2008* (Maastricht, The Netherlands, Aug. 26-29, 2008), Retrieved from: <http://www.noldus.com/mb2008/individual_papers/FPS_eye_tracking/FPS_eye_tracking_Prom-Tep.pdf> on Oct. 4, 2011,(Aug. 26, 2008), pp. 224-225.

Tilley, Steve "E3 09: Project Natal exposed", *Load This* [online] Retrieved from the Internet:<URL:http://blogs.canoe.ca/loadthis/general/e3-09-project-natal-exposed/>, (Jun. 1, 2009),4 pages.

Todd, Paul "Google Campaign Insights: Better Measurement for Display Advertising", Retrieved from: <http://adwordsagency.blogspot.com/2009/10/campaign-insights-better-measurement.html> on Nov. 14, 2011,(Oct. 19, 2009),3 pages.

Toyama, Kentaro et al., "Probabilistic Tracking in a Metric Space", *Eighth International Conference on Computer Vision*, Vancouver Canada, vol. 2, (Jul. 2001),8 pages.

Tresadern, Philip A., et al., "Visual Analysis of Articulated Motion", *DPhil Thesis, University of Oxford*, Oxford, U.K., (Oct. 12, 2006),1-171.

Vaucelle, Cati et al., "Picture This! Film Assembly Using Toy Gestures", Retrieved from <<http://web.media.mit.edu/~cati/PictureThis_Ubicomp.pdf>>, (2008),10 pages.

Walker, et al., "Age Related Differences in Movement Control: Adjusting Submovement Structure to Optimize Performance", *Journals of Gerontology*, (Jan. 1997),pp. 40-52.

Welford, Alan T., "Signal, Noise, Performance, and Age.", *Human Factors*, vol. 23, Issue 1, http://www.ingentaconnect.com/content/hfes/hf/1981/00000023/00000001/art0009, (1981),pp. 97-109.

Wilson, Andrew et al., "GWindows: Towards Robust Perception-Based UI", *Microsoft Research*, (2003),pp. 1-8.

Wilson, et al., "Hidden Markov Models for Modeling and Recognizing Gesture Under Variation", *Hidden Markov Model: Applications in Computer Vision.*, T.Caelli, ed. World Scientific, (2001),36 pages.

Worden, Aileen et al., "Making Computers Easier for Older Adults to Use: Area Cursors and Sticky Icons", *CHI 97*, Atlanta Georgia, USA, (1997),pp. 266-271.

Wren, Christopher et al., "Pfinder: Real-Time Tracking of the Human Body", *IEEE Transactions on Pattern Analysis and Machine Intelligence*, vol. 19, No. 7, (Jul. 1997),pp. 780-785.

Yakut, Isil D., et al., "User and Task Analysis of Multi-Level 3D File Browser", *Dept. of Computer Engineering, Bilkent University*, Ankara, Turkey, retrieved from <http://www.cs.bilkent.edu.tr/~cansin/projects/cs560-3dui/multi-level-3d-file-browser/3dui-report.pdf> on Nov. 15, 2011,4 pages.

Yoda, Ikushi et al., "Utilization of Stereo Disparity and Optical Flow Information for Human Interaction", *Proceedings of the Sixth International Conference on Computer Vision, IEEE Computer Society*, Washington D.C., USA, (1998),5 pages.

Zhai, Shumin et al., "The "Silk Cursor": Investigating Transparency for 3D Target Acquisition", *CHI 94*, (1994),pp. 273-279.

Zhang, Zhengyou "A Flexible New Technique for Camera Calibration", *IEEE Transactions on Pattern Analysis and Machine Intelligence*, vol. 22, No. 11, (Nov. 2000),pp. 1330-1334.

Zhang, Zhengyou "Flexible Camera Calibration by Viewing a Plane from Unknown Orientations", *Microsoft Research*, (1999),8 pages.

Zhao, Liang "Dressed Human Modeling, Detection, and Parts Localization", *The Robotics Institute, Carnegie Mellon University*, Pittsburgh, PA, (2001),121 Pages.

"Foreign Notice of Allowance", Canadian Application No. 2775700, (Jan. 3, 2013),1 page.

"Foreign Office Action", Canadian Application No. 2775814, (Dec. 14, 2012),3 pages.

"International Search Report and Written Opinion", Application No. PCT/US2012/034641, (Nov. 30, 2012), 9 pages.

"Non-Final Office Action", U.S. Appl. No. 12/794,406, (Sep. 14, 2012), 17 pages.

"Non-Final Office Action", U.S. Appl. No. 13/309,589, (Dec. 18, 2012), 10 pages.

"Non-Final Office Action", U.S. Appl. No. 13/316,351, (Feb. 14, 2013), 16 pages.

"Notice of Allowance", U.S. Appl. No. 12/474,453, (Dec. 12, 2012), 8 pages.

"Final Office Action", U.S. Appl. No. 13/441,228, (Sep. 11, 2013), 15 pages.

"Non-Final Office Action", U.S. Appl. No. 12/972,837, (Jun. 26, 2013), 10 pages.

"Notice of Allowance", U.S. Appl. No. 13/093,621, (Aug. 21, 2013), 7 pages.

"Notice of Allowance", U.S. Appl. No. 13/309,859, (Sep. 4, 2013), 7 pages.

"Restriction Requirement", U.S. Appl. No. 13/482,867, (Sep. 6, 2013), 6 pages.

"Restriction Requirement", U.S. Appl. No. 13/114,359, (Sep. 10, 2013), 6 pages.

"Final Office Action", U.S. Appl. No. 12/794,406, (Apr. 22, 2013),14 pages.

"Final Office Action", U.S. Appl. No. 13/316,351, (Jul. 31, 2013), 20 pages.

"Foreign Office Action", European Patent Application No. 12195349.1, (May 10, 2013), 5 pages.

"Non-Final Office Action", U.S. Appl. No. 13/093,621, (Jun. 20, 2013), 7 pages.

"Non-Final Office Action", U.S. Appl. No. 13/363,689, (Jul. 26, 2013),18 pages.

"Response to Non-Final Office Action", U.S. Appl. No. 12/794,406, (Feb. 14, 2013), 12 pages.

"European Search Report", European Patent Application No. 12195349.1, (Apr. 22, 2013), 3 pages.

"Final Office Action", U.S. Appl. No. 13/309,859, (May 15, 2013),13 pages.

(56) References Cited

OTHER PUBLICATIONS

"Foreign Office Action", European Patent Application No. 12194891.3, (Apr. 24, 2013), 5 pages.
"Non-Final Office Action", U.S. Appl. No. 13/025,180, (Apr. 5, 2013), 17 pages.
"Non-Final Office Action", U.S. Appl. No. 13/441,228, (Mar. 20, 2013), 12 pages.
"Non-Final Office Action", U.S. Appl. No. 13/488,046, (Jun. 13, 2013), 8 pages.
"Recognizing Visual Focus of Attention from Head Pose in Natural Meetings", *IEEE Transactions on Systems, Man, and Cybernetics, Part B: Cybernetics—Special Issue on Human Computing*, vol. 39, Issue 1, (Feb. 2009), 36 pages.
"Restriction Requirement", U.S. Appl. No. 13/488,046, (May 2, 2013), 5 pages.
"Supplementary European Search Report", European Patent Application No. 12194891.3, (Apr. 4, 2013), 3 pages.
Asteriadis, Stylianos et al., "Estimation of Behavioral User State based on Eye Gaze and Head Pose—Application in an e-Learning Environment", *Journal of Multimedia Tools and Applications*, vol. 41, Issue 3, (Feb. 2009), 25 pages.
Ba, Sileye O., et al., "Head Pose Tracking and Focus of Attention Recognition Algorithms in Meeting Rooms", *Proceedings of the 1st International Evaluation Conference on Classification of Events, Activities and Relationships*, (Apr. 6, 2006), 12 pages.
Boser, Bernhard E., et al., "A Training Algorithm for Optimal Margin Classifiers", *Proceedings of the Fifth Annual Workshop on Computational Learning Theory*, (Jul. 27, 1992), 9 pages.
Bradley, Margaret M., et al., "Measuring Emotion: The Self-Assessment Manikin and the Semantic Differential", *In Journal of Behavior Therapy and Experimental Psychiatry*, vol. 25, Issue 1, (Mar. 1994), 11 pages.
Chang, Chih-Chung et al., "LIBSVM: A Library for Support Vector Machines", retrieved from <http://www.csie.ntu.edu.tw/~cjlin/libsvm/> on Apr. 1, 2013, 4 pages.
El Kaliouby, Rana et al., "Real Time Inference of Complex Mental States from Facial Expressions and Head Gestures", *Proceedings of Conference on Computer Vision and Pattern Recognition Workshop*, (Jun. 27, 2004), 20 pages.
Grace, Richard et al., "A Drowsy Driver Detection System for Heavy Vehicles", *Proceedings of the 17th Digital Avionics Systems Conference*, vol. 2, (Oct. 31, 1998), 8 pages.
Guyon, Isabelle et al., "An Introduction to Variable and Feature Selection", *In Journal of Machine Learning Research*, vol. 3, (Mar. 2003), pp. 1157-1182.
Kapoor, Ashish et al., "Multimodal Affect Recognition in Learning Environments", *Proceedings of the 13th Annual ACM International Conference on Multimedia*, (Nov. 6, 2005), 6 pages.
Liang, Lin et al., "Face Alignment via Component-Based Discriminative Search", *Computer Vision, ECCV 2008, Lecture Notes in Computer Science* vol. 5303, (2008), 14 pages.
McDuff, Daniel "Affective Storytelling: Automatic Measurement of Story Effectiveness from Emotional Responses Collected over the Internet", *PhD Thesis*, retrieved from <http://web.media.mil.edu/~djmcduff/documents/McDuff_Thesis_Proposal.pdf>pdf>>, (Jun. 6, 2012), 16 pages.
McDuff, Daniel et al., "Crowdsourcing Facial Responses to Online Videos", *Proceedings of the IEEE Transactions on Affective Computing*, vol. 3, Issue 4, (Oct. 2012), pp. 456-468.
McDuff, et al., "AffectAura: An Intelligent System for Emotional Memory", *In Proceedings of the SIGCHI Conference on Human Factors in Computing Systems*, Retrieved from <http://www.affectiva.com/assets/Q-Sensor-Microsoft-Publication.pdf>, (May 5, 2012), 10 pages.
Op Den Akker, Rieks et al., "Supporting Engagement and Floor Control in Hybrid Meetings", *In Cross-Modal Analysis of Speech, Gestures, Gaze, and Facial Expressions*, (Jul. 2009), 15 pages.
Peacock, James et al., "Which Broadcast Medium Better Drives Engagement? Measuring the Powers of Radio and Television with Electromyography and Skin-Conductance Measurements", *In Journal of Advertising Research*, vol. 51, Issue 4, (Dec. 2011), 8 pages.
Poels, Karolien et al., "How to Capture the Heart? Reviewing 20 Years of Emotion Measurement in Advertising", *In the Journal of Advertising Research*, vol. 46, Issue 1, (Mar. 2006), 48 pages.
Viola, Paul et al., "Robust Real-Time Face Detection", *In International Journal of Computer Vision*, vol. 57, Issue 2, (May 2004), 18 pages.
Voit, Michael et al., "Deducing the Visual Focus of Attention from Head Pose Estimation in Dynamic Multi-View Meeting Scenarios", *Proceedings of the 1oth International Conference on Multimodal Interfaces*, (Oct. 20, 2008), 8 pages.
Wedel, Michel et al., "Eye Fixations on Advertisements and Memory for Brands: A Model and Findings", *Journal of Marketing Science*, vol. 19, Issue 4, (Oct. 2000), pp. 297-312.
Wood, Orlando "Using Faces: Measuring Emotional Engagement for Early Stage Creative", *In ESOMAR, Best Methodology, Annual Congress*, (Sep. 19, 2007), 29 pages.
Zhang, Zhenqiu et al., "Head Pose Estimation in Seminar Room Using Multi View Face Detectors", *Proceedings of the 1st International Evaluation Conference on Classifications of Events, Activities and Relationships*, (Mar. 30, 2006), 7 pages.
"International Search Report", Mailed Date: Jul. 5, 2013, Application No. PCT/US2013/035047, Filed Date: Apr. 3, 2013, pp. 10.
"Notice of Allowance", U.S. Appl. No. 12/972,837, Oct. 11, 2013, 10 pages.
"Non-Final Office Action", U.S. Appl. No. 13/118,884, Dec. 3, 2013, 10 pages.
"Final Office Action", U.S. Appl. No. 13/488,046, Dec. 10, 2013, 12 pages.
"Non-Final Office Action", U.S. Appl. No. 13/482,867, Nov. 5, 2013, 13 pages.
"International Search Report and Written Opinion", Application No. PCT/US2013/035348, Sep. 25, 2013, 16 pages.
"Corrected Notice of Allowance", U.S. Appl. No. 13/309,859, Oct. 29, 2013, 3 pages.
"Restriction Requirement", U.S. Appl. No. 13/039,024, Oct. 1, 2013, 5 pages.
"Restriction Requirement", U.S. Appl. No. 13/114,359, Dec. 18, 2013, 6 pages.
"Response to Office Action", U.S. Appl. No. 12/794,406, Jul. 22, 2013, 9 pages.
"Non-Final Office Action", U.S. Appl. No. 13/039,024, Apr. 7, 2014, 12 pages.
"Final Office Action", U.S. Appl. No. 13/488,046, May 1, 2014, 12 pages.
"Final Office Action", U.S. Appl. No. 13/025,180, Mar. 14, 2014, 21 pages.
"Final Office Action", U.S. Appl. No. 13/363,689, Feb. 11, 2014, 18 pages.
"Final Office Action", U.S. Appl. No. 13/482,867, Feb. 21, 2014, 15 pages.
"International Search Report and Written Opinion", Application No. PCT/US2013/038710, Jan. 8, 2014, 18 pages.
"Non-Final Office Action", U.S. Appl. No. 13/411,859, Mar. 11, 2014, 13 pages.
"Non-Final Office Action", U.S. Appl. No. 13/488,046, Mar. 14, 2014, 11 pages.
"Non-Final Office Action", U.S. Appl. No. 13/866,699, Feb. 7, 2014, 15 pages.
"Notice of Allowance", U.S. Appl. No. 13/118,884, Feb. 4, 2014, 7 pages.
"Advisory Action", U.S. Appl. No. 13/025,180, Jul. 3, 2014, 3 pages.
"Final Office Action", U.S. Appl. No. 13/411,859, Aug. 8, 2014, 16 pages.
"International Search Report and Written Opinion", Application No. PCT/US2013/039591, Aug. 1, 2014, 10 pages.
"Non-Final Office Action", U.S. Appl. No. 13/316,351, Jun. 19, 2014, 23 pages.
"Non-Final Office Action", U.S. Appl. No. 13/331,886, Jun. 19, 2014, 18 pages.
"Non-Final Office Action", U.S. Appl. No. 13/363,689, Sep. 15, 2014, 21 pages.

(56) References Cited

OTHER PUBLICATIONS

"Non-Final Office Action", U.S. Appl. No. 13/488,046, Jul. 23, 2014, 12 pages.
"Non-Final Office Action", U.S. Appl. No. 14/108,008, Aug. 14, 2014, 16 pages.
"Final Office Action", U.S. Appl. No. 12/794,406, Jun. 4, 2014, 14 pages.
"Foreign Office Action", CN Application No. 201110159923.8, May 22, 2014, 10 pages.
"Foreign Office Action", CN Application No. 201110159923.8, Sep. 2, 2013, 13 pages.
"Non-Final Office Action", U.S. Appl. No. 12/794,406, Sep. 6, 2013, 13 pages.
"Non-Final Office Action", U.S. Appl. No. 13/114,359, Oct. 20, 2014, 7 pages.
"Non-Final Office Action", U.S. Appl. No. 13/441,228, Oct. 2, 2014, 18 pages.
"Notice of Allowance", U.S. Appl. No. 13/482,867, Sep. 30, 2014, 17 pages.
"Summons to Attend Oral Proceedings", EP Application No. 12194891.3, Sep. 17, 2014, 7 Pages.
"Summons to Attend Oral Proceedings", EP Application No. 12195349.1, Sep. 17, 2014, 7 Pages.

\* cited by examiner

CONTROLLING A MEDIA PROGRAM BASED ON A MEDIA REACTION

BACKGROUND

Currently, users enjoying media programs often desire to control those media programs during their presentation, such as to pause, mute, or stop the presentation. A user, for example, may wish to stop a television show while he or she gets up from watching the television show to get a snack. To do so, conventional controls, such as a remote control, may require that the user find the remote control, find a stop button on the remote control, press the button, and, once he or she returns with the snack, again find the remote control, find the play button, and press the play button.

A user may instead be listening to a music program and a friend listening with the user may start talking to the user during the music program. In such a case, the user may wish to pause, reduce the volume, or mute the music program until the discussion is done. Conventional methods permit the user to pause, reduce the volume, or mute the program through intentional, active control by the user, such as through a volume dial on a stereo amplifier or through a remote control. Controlling the music program through these methods, however, may be slow, thereby causing the user to miss some of what the friend said, or otherwise not provide a good user experience.

Further still, the user may have a young son or daughter that unexpectedly steps into the room where there is playing a song or movie that the user does not wish the son or daughter to hear or see. In such a case, the user may attempt to stop the media program, though this attempt at control may be undesirably slow.

These are but a few examples of ways in which conventional methods for controlling media programs may fail to provide a good user experience.

SUMMARY

This document describes techniques and apparatuses for controlling a media program based on a media reaction. In some embodiments, the techniques pause, mute, or stop a media program when a user leaves the room, when a user in the room is talking or is otherwise not paying attention to the program, or when a child walks into the room.

This summary is provided to introduce simplified concepts for controlling a media program based on a media reaction, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for controlling a media program based on a media reaction are described with reference to the following drawings. The same numbers are used throughout the drawings to reference like features and components.

DETAILED DESCRIPTION

Overview

This document describes techniques and apparatuses for controlling a media program based on a media reaction. Consider, for example, a case where two people, Bob and Janet, are watching a television drama. Assume that Janet turns to Bob to talk. At this point, or responsive to Bob turning to Janet to talk back to her, the techniques pause the program. Neither of these two people hunted for, found, nor selected a remote control to pause the program. Further still, assume that Bob or Bob and Janet turn their heads back toward the television. At this point the techniques resume the program. Note again that neither of these two people had to use the remote control for the program to resume.

Consider also a case where the television drama is not appropriate for children. As Bob and Janet do not wish their children to see this program, they are watching the program after the children have gone to bed. Assume, however, that their daughter, Abigail, who is six years old, gets up from bed and walks into the room where Bob and Janet are watching the drama. Rather than hunt for, find, and quickly press a stop button on a remote control, the techniques instead black out the screen and mute the audio as soon as Abigail walks into the room. When Abigail leaves the room, the techniques may wait a short period, rewind the drama to a point at or prior to when the drama was blacked out and muted, and resume the drama.

These are but two examples of how the techniques and/or apparatuses may control a media program based on a media reaction, though many others are contemplated herein. Techniques and/or apparatuses are referred to herein separately or in conjunction as the "techniques" as permitted by the context. This document now turns to an example environment in which the techniques can be embodied and then various example methods that can, but are not required to, work in conjunction with the techniques. Some of these various methods include methods for sensing and determining reactions to media and building a reaction history for a user. After these various example methods, this document turns to example methods for controlling a media program based on a media reaction.

Example Environment

Figure 1:
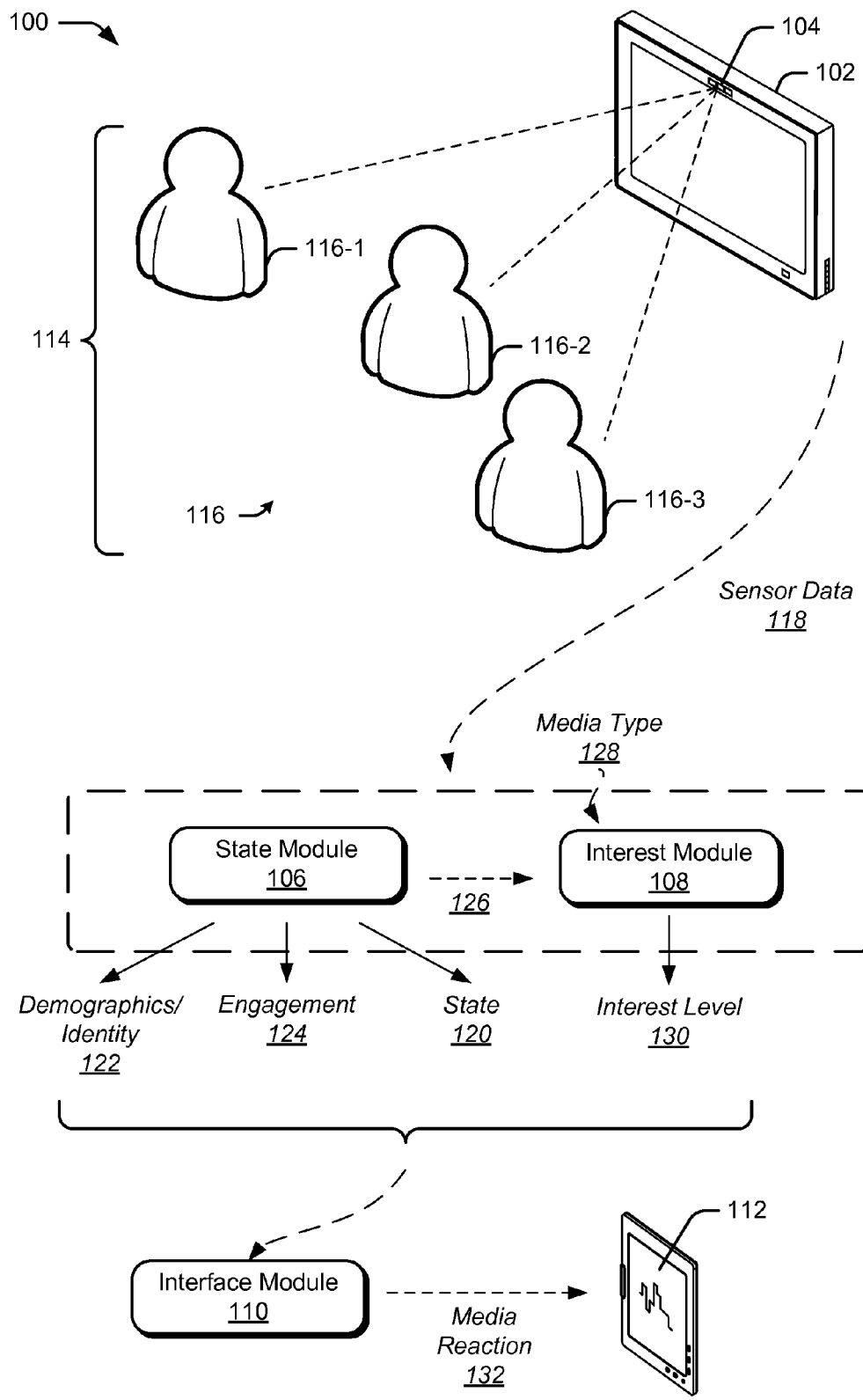
FIG. 1 illustrates an example environment in which techniques for controlling a media program based on a media reaction can be implemented, as well as other techniques.

FIG. 1 is an illustration of an example environment 100 for receiving sensor data and determining media reactions based on this sensor data. These media reactions can be used to control media programs, as well as other uses. The techniques may use these media reactions alone or in combination with other information, such as demographics, reaction histories, and information about the people and media program or portion thereof.

Environment 100 includes a media presentation device 102, an audience-sensing device 104, a state module 106, an interest module 108, an interface module 110, and a user interface 112.

Media presentation device 102 presents a media program to an audience 114 having one or more users 116. A media program can include, alone or in combination, a television show, a movie, a music video, a video clip, an advertisement, a blog, a web page, an e-book, a computer game, a song, an album or program of songs, a slideshow or other arrangement of images, a tweet, or other audio and/or video media. Audience 114 can include one or more users 116 that are in locations enabling consumption of a media program presented by media presentation device 102 and measurement by audience-sensing device 104, whether separately or within one audience 114. In audience 114 three users are shown: user 116-1, user 116-2, and user 116-3. While only three users are shown sensor data can be sensed and media reactions determined at many locations and for tens, hundreds, thousands, or even millions of users.

Audience-sensing device 104 is capable of sensing audience 114 and providing sensor data for audience 114 to state module 106 and/or interest module 108 (sensor data 118 shown provided via an arrow). The data sensed can be sensed passively, actively, and/or responsive to an explicit request.

Passively sensed data is passive by not requiring active participation of users in the measurement of those users. Actively sensed data includes data recorded by users in an audience, such as with handwritten logs, and data sensed from users through biometric sensors worn by users in the audience. Sensor data sensed responsive to an explicit request can be sensed actively or passively. One example where the techniques, prior to or during control of a media program, request that a user perform a particular action to produce a particular result, such as raise a hand if the user wishes the techniques to cease to pause or mute a media program. In such a case, the user is expressing a reaction of raising a hand, though this can be passively sensed by not requiring the user to actively participate in the measurement of the reaction. The techniques sense this raised hand in various manners as set forth below.

Sensor data can include data sensed using emitted light or other signals sent by audience-sensing device 104, such as with an infrared sensor bouncing emitted infrared light off of users or the audience space (e.g., a couch, walls, etc.) and sensing the light that returns. Examples of sensor data measuring a user and ways in which it can be measured are provided in greater detail below.

Audience-sensing device 104 may or may not process sensor data prior to providing it to state module 106 and/or interest module 108. Thus, sensor data may be or include raw data or processed data, such as: RGB (Red, Green, Blue) frames; infrared data frames; depth data; heart rate; respiration rate; a user's head orientation or movement (e.g., coordinates in three dimensions, x, y, z, and three angles, pitch, tilt, and yaw); facial (e.g., eyes, nose, and mouth) orientation, movement, or occlusion; skeleton's orientation, movement, or occlusion; audio, which may include information indicating orientation sufficient to determine from which user the audio originated or directly indicating which user, or what words were said, if any; thermal readings sufficient to determine or indicating presence and locations of one of users 116; and distance from the audience-sensing device 104 or media presentation device 102. In some cases audience-sensing device 104 includes infrared sensors (webcams, Kinect cameras), stereo microphones or directed audio microphones, and a thermal reader (in addition to infrared sensors), though other sensing apparatuses may also or instead be used.

State module 106 receives sensor data and determines, based on the sensor data, states 120 of users 116 in audience 114 (shown at arrow). States include, for example: sad, talking, disgusted, afraid, smiling, scowling, placid, surprised, angry, laughing, screaming, clapping, waving, cheering, looking away, looking toward, leaning away, leaning toward, asleep, newly arrived, or departed, to name just a few.

The talking state can be a general state indicating that a user is talking, though it may also include subcategories based on the content of the speech, such as talking about the media program (related talking) or talking that is unrelated to the media program (unrelated talking). State module 106 can determine which talking category through speech recognition.

State module 106 may also or instead determine, based on sensor data, a number of users, a user's identity and/or demographic data (shown at 122), or engagement (shown at 124) during presentation. Identity indicates a unique identity for one of users 116 in audience 114, such as Susan Brown. Demographic data classifies one of users 116, such as 5 feet, 4 inches tall, young child, and male or female. Engagement indicates whether a user is likely to be paying attention to the media program, such as based on that user's presence or head orientation. Engagement, in some cases, can be determined by state module 106 with lower-resolution or less-processed sensor data compared to that used to determine states. Even so, engagement can be useful in measuring an audience, whether on its own or to determine a user's interest using interest module 108.

Interest module 108 determines, based on sensor data 118 and/or a user's engagement or state (shown with engagement/state 126 at arrow) and information about the media program (shown at media type 128 at arrow), that user's interest level 130 (shown at arrow) in the media program. Interest module 108 may determine, for example, that multiple laughing states for a media program intended to be a serious drama indicate a low level of interest and conversely, that for a media program intended to be a comedy, that multiple laughing states indicate a high level of interest.

As illustrated in FIG. 1, state module 106 and/or interest module 108 provide demographics/identity 122 as well as one or more of the following media reactions: engagement 124, state 120, or interest level 130, all shown at arrows in FIG. 1. Based on one or more of these media reactions, state module 106 and/or interest module 108 may also provide another type of media reaction, that of overall media reactions to a media program, such as a rating (e.g., thumbs up or three stars). In some cases, however, media reactions are received and overall media reactions are determined instead by interface module 110.

Figure 2:
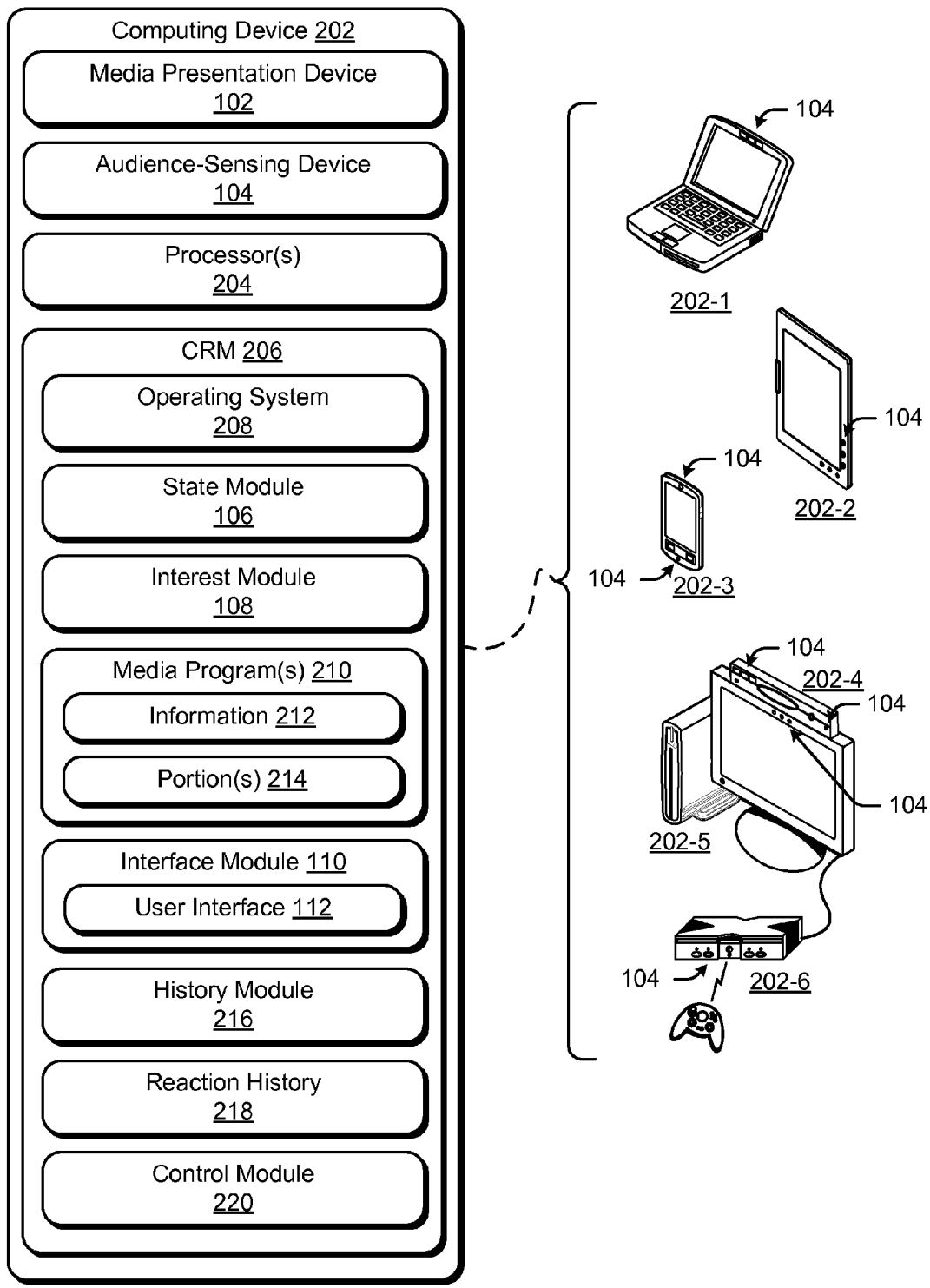
FIG. 2 is an illustration of an example computing device that is local to the audience of FIG. 1.
Figure 3:
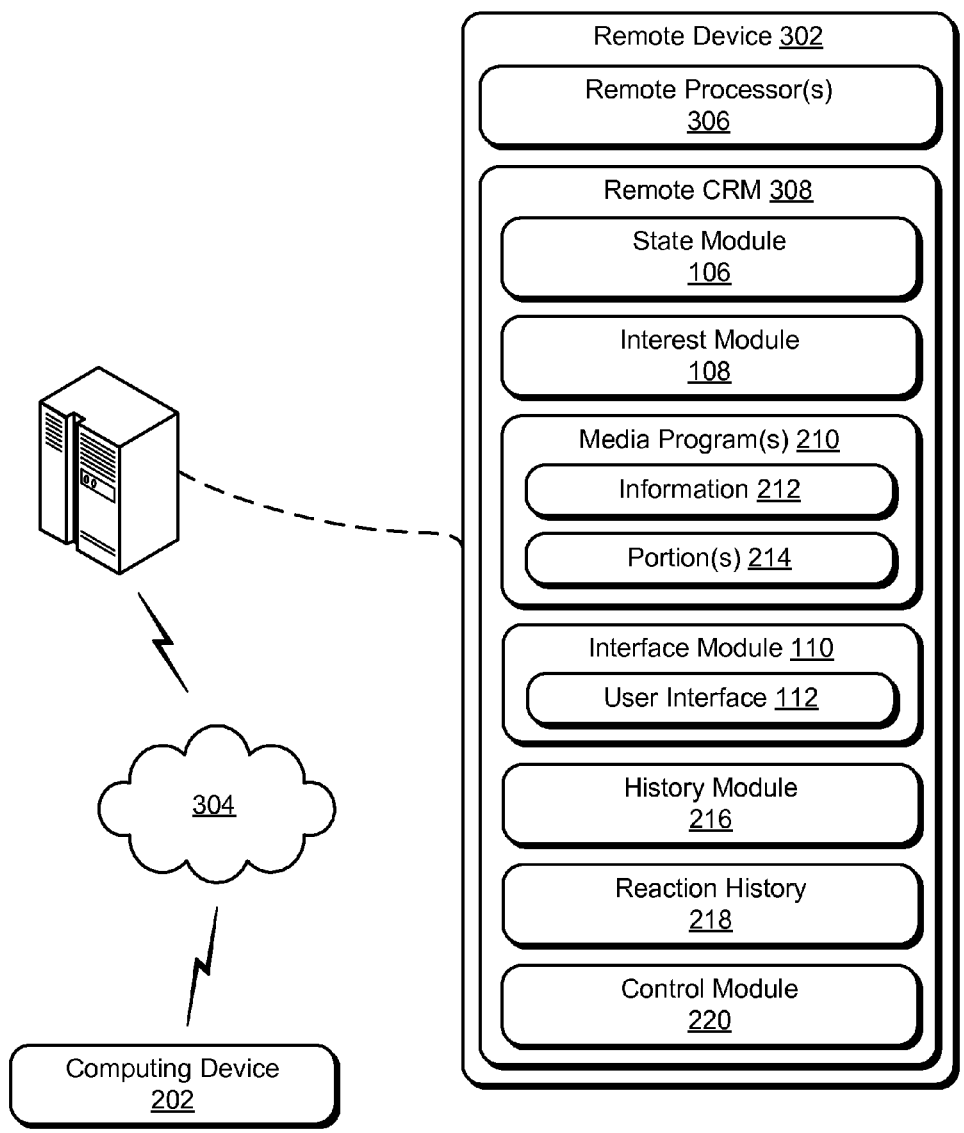
FIG. 3 is an illustration of an example remote computing device that is remote to the audience of FIG. 1.

State module 106 and interest module 108 can be local to audience 114, and thus media presentation device 102 and audience-sensing device 104, though this is not required. An example embodiment where state module 106 and interest module 108 are local to audience 114 is shown in FIG. 2. In some cases, however, state module 106 and/or interest module 108 are remote from audience 114, which is illustrated in FIG. 3.

Interface module 110 receives media reactions and demographics/identity information, and determines or receives some indication as to which media program or portion thereof that the reactions pertain. Interface module 110 may present, or causes to be presented, a media reaction 132 to a media program through user interface 112, though this is not required.

Interface module 110 can be local to audience 114, such as in cases where one user is viewing his or her own media reactions or those of a family member. In many cases, however, interface module 110 receives media reactions from a remote source.

Note that sensor data 118 may include a context in which a user is reacting to media or a current context for a user for which ratings or recommendations for media are requested. Thus, audience-sensing device 104 may sense that a second person is in the room or is otherwise in physical proximity to the first person, which can be context for the first person. Contexts may also be determined in other manners described in FIG. 2 below.

FIG. 2 is an illustration of an example computing device 202 that is local to audience 114. Computing device 202 includes or has access to media presentation device 102, audience-sensing device 104, one or more processors 204, and computer-readable storage media ("CRM") 206.

CRM 206 includes an operating system 208, state module 106, interest module 108, media program(s) 210, each of which may include or have associated program information 212 and portions 214, interface module 110, user interface 112, history module 216, reaction history 218, and control module 220.

Each of media programs 210 may have, include, or be associated with program information 212 and portions 214. Program information 212 can indicate the name, title, episode, author or artist, type of program, and other information, including relating to various portions within each media program 210. Thus, program information 212 may indicate that one of media programs 210 is a music video, includes a chorus portion that is repeated four times, includes four verse portions, includes portions based on each visual presentation during the song, such as the artist singing, the backup singers dancing, the name of the music video, the artist, the year produced, resolution and formatting data, and so forth.

Portions 214 of one of media programs 210 make up the program, each of which may have metadata or other information about each portion (e.g., an "R" rating for a particular portion but not others of a same movie). These portions may represent particular time-ranges in the media program, such as two, five, or fifteen-second periods. These portions may instead represent cohesive portions in the media program, which may be based on content in the cohesive portion, such as a complete song being played in a radio-like program, a possession or play in a sporting event, an act in a theatrical play, an advertisement of a block of advertisements, or a scene of a movie, to name a few.

History module 216 includes or has access to reaction history 218. History module 216 may build and update reaction history 218 based on ongoing reactions by the user (or others as noted below) to media programs. In some cases history module 216 determines various contexts for a user, though this may instead be determined and received from other entities. Thus, in some cases history module 216 determines a time, a locale, weather at the locale, and so forth, during the user's reaction to a media program or request for ratings or recommendations for a media program. History module 216 may determine ratings and/or recommendations for media based on a current context for a user and reaction history 218. Reaction history 218, as noted elsewhere herein, may be used along with a media reaction as a basis for controlling presentation of a media program.

Control module 220 is capable of controlling presentation of a media program based on a media reaction. Control module 220 may exercise control based a media reaction indicating as little as a person being present and having an identity or demographic, for example. Thus, control module 220 may control a media program based on a media reaction indicating that a person has walked into a room and that the person is a child. Or, control module 220 may obscure a currently-playing scene of a movie showing a horse with a broken leg based on the person's identity indicating, through that person's reaction history 218, that the person is likely to be sensitive to scenes showing animals in distress.

As shown in FIGS. 2 and 3, media program 210, portions 214, or control module 220 may be local or remote from computing device 202 and thus the user or users having the media reactions (e.g., user 116-1 of audience 114 of FIG. 1).

Note that in this illustrated example, entities including media presentation device 102, audience-sensing device 104, state module 106, interest module 108, interface module 110, history module 216, and control module 220 are included within a single computing device, such as a desktop computer having a display, forward-facing camera, microphones, audio output, and the like. Each of these entities, however, may be separate from or integral with each other in one or multiple computing devices or otherwise. As will be described in part below, media presentation device 102 can be integral with audience-sensing device 104 but be separate from state module 106, interest module 108, interface module 110, history module 216, or control module 220. Further, each of these modules may operate on separate devices or be combined in one device.

As shown in FIG. 2, computing device(s) 202 can each be one or a combination of various devices, here illustrated with six examples: a laptop computer 202-1, a tablet computer 202-2, a smart phone 202-3, a set-top box 202-4, a desktop 202-5, and a gaming system 202-6, though other computing devices and systems, such as televisions with computing capabilities, netbooks, and cellular phones, may also be used. Note that three of these computing devices 202 include media presentation device 102 and audience-sensing device 104 (laptop computer 202-1, tablet computer 202-2, smart phone 202-3). One device excludes but is in communication with media presentation device 102 and audience-sensing device 104 (desktop 202-5). Two others exclude media presentation device 102 and may or may not include audience-sensing device 104, such as in cases where audience-sensing device 104 is included within media presentation device 102 (set-top box 202-4 and gaming system 202-6).

FIG. 3 is an illustration of an example remote computing device 302 that is remote to audience 114. FIG. 3 also illustrates a communications network 304 through which remote computing device 302 communicates with audience-sensing device 104 (not shown, but embodied within, or in communication with, computing device 202), interface module 110, history module 216 (including or excluding reaction history 218), or control module 220, assuming that these entities are in computing device 202 as illustrated in FIG. 2. Communication network 304 may be the Internet, a local-area network, a wide-area network, a wireless network, a USB hub, a computer bus, another mobile communications network, or a combination of these.

Remote computing device 302 includes one or more processors 306 and remote computer-readable storage media ("remote CRM") 308. Remote CRM 308 includes state module 106, interest module 108, media program(s) 210, each of which may include or have associated program information 212 and/or portions 214, history module 216, reaction history 218, and control module 220.

Note that in this illustrated example, media presentation device 102 and audience-sensing device 104 are physically separate from state module 106 and interest module 108, with the first two local to an audience viewing a media program and the second two operating remotely. Thus, sensor data is passed from audience-sensing device 104 to one or both of state module 106 or interest module 108, which can be communicated locally (FIG. 2) or remotely (FIG. 3). Further, after determination by state module 106 and/or interest module 108, various media reactions and other information can be communicated to the same or other computing devices 202 for receipt by interface module 110, history module 216, and/or control module 220. Thus, in some cases a first of computing devices 202 may measure sensor data, communicate that sensor data to remote device 302, after which remote device 302 communicates media reactions to another of computing devices 202, all through network 304.

These and other capabilities, as well as ways in which entities of FIGS. 1-3 act and interact, are set forth in greater detail below. These entities may be further divided, combined, and so on. The environment 100 of FIG. 1 and the detailed illustrations of FIGS. 2 and 3 illustrate some of many possible environments capable of employing the described techniques.

Example Methods

Determining Media Reactions Based on Passive Sensor Data

Figure 4:
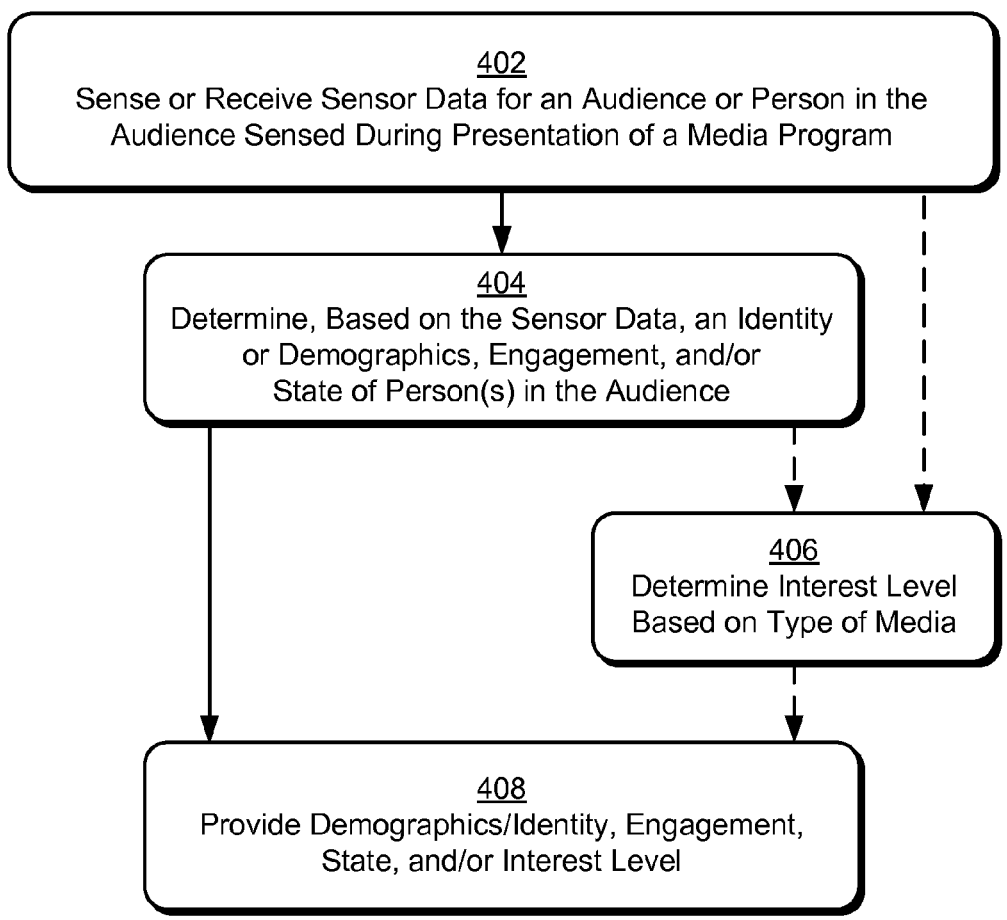
FIG. 4 illustrates example methods for determining media reactions based on passive sensor data.

FIG. 4 depicts methods 400 determines media reactions based on passive sensor data. These and other methods described herein are shown as sets of blocks that specify operations performed but are not necessarily limited to the order shown for performing the operations by the respective blocks. In portions of the following discussion reference may be made to environment 100 of FIG. 1 and entities detailed in FIGS. 2-3, reference to which is made for example only. The techniques are not limited to performance by one entity or multiple entities operating on one device.

Block 402 senses or receives sensor data for an audience or user, the sensor data passively sensed during presentation of a media program to the audience or user. This sensor data may include a context of the audience or user or a context may be received separately, though a context is not required.

Consider, for example, a case where an audience includes three users 116, users 116-1, 116-2, and 116-3 all of FIG. 1. Assume that media presentation device 102 is an LCD display having speakers and through which the media program is rendered and that the display is in communication with set-top box 202-4 of FIG. 2. Here audience-sensing device 104 is a Kinect, forward-facing high-resolution infrared sensor, a red-green-blue sensor and two microphones capable of sensing sound and location that is integral with set-top box 202-4 or media presentation device 102. Assume also that the media program 210 being presented is a PG-rated animated movie named Incredible Family, which is streamed from a remote source and through set-top box 202-4. Set-top box 202-4 presents Incredible Family with six advertisements, spaced one at the beginning of the movie, three in a three-ad block, and two in a two-ad block.

Sensor data is received for all three users 116 in audience 114; for this example consider first user 116-1. Assume here that, over the course of Incredible Family, that audience-sensing device 104 measures, and then provides at block 402, the following at various times for user 116-1:

Time 1, head orientation 3 degrees, no or low-amplitude audio.
Time 2, head orientation 24 degrees, no audio.
Time 3, skeletal movement (arms), high-amplitude audio.
Time 4, skeletal movement (arms and body), high-amplitude audio.
Time 5, head movement, facial-feature change (20%), moderate-amplitude audio.
Time 6, detailed facial orientation data, no audio.
Time 7, skeletal orientation (missing), no audio.
Time 8, facial orientation, respiration rate.

Block 404 determines, based on the sensor data, a state of the user during the media program. In some cases block 404 determines a probability for the state or multiple probabilities for multiple states, respectively. For example, block 404 may determine a state likely to be correct but with less than full certainty (e.g., 40% chance that the user is laughing). Block 404 may also or instead determine that multiple states are possible based on the sensor data, such as a sad or placid state, and probabilities for each (e.g., sad state 65%, placid state 35%).

Block 404 may also or instead determine demographics, identity, and/or engagement. Further, methods 400 may skip block 404 and proceed directly to block 406, as described later below.

In the ongoing example, state module 106 receives the above-listed sensor data and determines the following corresponding states for user 116-1:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

At Time 1 state module 106 determines, based on the sensor data indicating a 3-degree deviation of user 116-1's head from looking directly at the LCD display and a rule indicating that the looking toward state applies for deviations of less than 20 degrees (by way of example only), that user 116-1's state is looking toward the media program. Similarly, at Time 2, state module 106 determines user 116-1 to be looking away due to the deviation being greater than 20 degrees.

At Time 3, state module 106 determines, based on sensor data indicating that user 116-1 has skeletal movement in his arms and audio that is high amplitude that user 116-1 is clapping. State module 106 may differentiate between clapping and other states, such as cheering, based on the type of arm movement (not indicated above for brevity). Similarly, at Time 4, state module 106 determines that user 116-1 is cheering due to arm movement and high-amplitude audio attributable to user 116-1.

At Time 5, state module 106 determines, based on sensor data indicating that user 116-1 has head movement, facial-feature changes of 20%, and moderate-amplitude audio, that user 116-1 is laughing. Various sensor data can be used to differentiate different states, such as screaming, based on the audio being moderate-amplitude rather than high-amplitude and the facial-feature changes, such as an opening of the mouth and a rising of both eyebrows.

For Time 6, audience-sensing device 104 processes raw sensor data to provide processed sensor data, and in this case facial recognition processing to provide detailed facial orientation data. In conjunction with no audio, state module 106 determines that the detailed facial orientation data (here upturned lip corners, amount of eyelids covering eyes) that user 116-1 is smiling.

At Time 7, state module 106 determines, based on sensor data indicating that user 116-1 has skeletal movement moving away from the audience-sensing device 104, that user 116-1 is departed. The sensor data may indicate this directly as well, such as in cases where audience-sensing device 104 does not sense user 116-1's presence, either through no skeletal or head readings or a thermal signature no longer being received.

At Time 8, state module 106 determines, based on sensor data indicating that user 116-1's facial orientation has not changed over a certain period (e.g., the user's eyes have not blinked) and a steady, slow respiration rate that user 116-1 is asleep.

These eight sensor readings are simplified examples for purpose of explanation. Sensor data may include extensive data as noted elsewhere herein. Further, sensor data may be received measuring an audience every fraction of a second, thereby providing detailed data for tens, hundreds, and thousands of periods during presentation of a media program and from which states or other media reactions may be determined.

Returning to methods 400, block 404 may determine demographics, identity, and engagement in addition to a user's state. State module 106 may determine or receive sensor data from which to determine demographics and identity or receive, from audience-sensing device 104, the demographics or identity. Continuing the ongoing example, the sensor data for user 116-1 may indicate that user 116-1 is John Brown, that user 116-2 is Lydia Brown, and that user 116-3 is Susan Brown. Or sensor data may indicate that user 116-1 is six feet, four inches tall and male (based on skeletal orientation), for example. The sensor data may be received with or include information indicating portions of the sensor data attributable separately to each user in the audience. In this present example, however, assume that audience-sensing device 104 provides three sets of sensor data, with each set indicating the identity of the user along with the sensor data.

Also at block 404, the techniques may determine an engagement of an audience or user in the audience. As noted, this determination can be less refined than that of states of a user, but nonetheless is useful. Assume for the above example, that sensor data is received for user 116-2 (Lydia Brown), and that this sensor data includes only head and skeletal orientation:

Time 1, head orientation 0 degrees, skeletal orientation upper torso forward of lower torso.
Time 2, head orientation 2 degrees, skeletal orientation upper torso forward of lower torso.
Time 3, head orientation 5 degrees, skeletal orientation upper torso approximately even with lower torso.
Time 4, head orientation 2 degrees, skeletal orientation upper torso back from lower torso.
Time 5, head orientation 16 degrees, skeletal orientation upper torso back from lower torso.
Time 6, head orientation 37 degrees, skeletal orientation upper torso back from lower torso.
Time 7, head orientation 5 degrees, skeletal orientation upper torso forward of lower torso.
Time 8, head orientation 1 degree, skeletal orientation upper torso forward of lower torso.

State module 106 receives this sensor data and determines the following corresponding engagement for Lydia Brown:

Time 1: Engagement High.
Time 2: Engagement High.
Time 3: Engagement Medium-High.
Time 4: Engagement Medium.
Time 5: Engagement Medium-Low.
Time 6: Engagement Low.
Time 7: Engagement High.
Time 8: Engagement High.

At Times 1, 2, 7, and 8, state module 106 determines, based on the sensor data indicating a 5-degree-or-less deviation of user 116-2's head from looking directly at the LCD display and skeletal orientation of upper torso forward of lower torso (indicating that Lydia is leaning forward to the media presentation) that Lydia is highly engaged in Incredible Family at these times.

At Time 3, state module 106 determines that Lydia's engagement level has fallen due to Lydia no longer leaning forward. At Time 4, state module 106 determines that Lydia's engagement has fallen further to medium based on Lydia leaning back, even though she is still looking almost directly at Incredible Family.

At Times 5 and 6, state module 106 determines Lydia is less engaged, falling to Medium-Low and then Low engagement based on Lydia still leaning back and looking slightly away (16 degrees) and then significantly away (37 degrees), respectively. Note that at Time 7 Lydia quickly returns to a High engagement, which media creators are likely interested in, as it indicates content found to be exciting or otherwise captivating.

Methods 400 may proceed directly from block 402 to block 406, or from block 404 to block 406 or block 408. If proceeding to block 406 from block 404, the techniques determine an interest level based on the type of media being presented and the user's engagement or state. If proceeding to block 406 from block 402, the techniques determine an interest level based on the type of media being presented and the user's sensor data, without necessarily first or independently determining the user's engagement or state.

Continuing the above examples for users 116-1 and 116-2, assume that block 406 receives states determined by state module 106 at block 404 for user 116-1 (John Brown). Based on the states for John Brown and information about the media program, interest module 108 determines an interest level, either overall or over time, for Incredible Family. Assume here that Incredible Family is both an adventure and a comedy program, with portions of the movie marked as having one of these media types. While simplified, assume that Times 1 and 2 are marked as comedy, Times 3 and 4 are marked as adventure, Times 5 and 6 are marked as comedy, and that Times 7 and 8 are marked as adventure. Revisiting the states determined by state module 106, consider the following again:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

Based on these states, state module 106 determines for Time 1 that John Brown has a medium-low interest in the content at Time 1—if this were of an adventure or drama type, state module 106 may determine John Brown to instead be highly interested. Here, however, due to the content being comedy and thus intended to elicit laughter or a similar state, interest module 108 determines that John Brown has a medium-low interest at Time 1. Similarly, for Time 2, interest module 108 determines that John Brown has a low interest at Time 2 because his state is not only not laughing or smiling but is looking away.

At Times 3 and 4, interest module 108 determines, based on the adventure type for these times and states of clapping and cheering, that John Brown has a high interest level. At time 6, based on the comedy type and John Brown smiling, that he has a medium interest at this time.

At Times 7 and 8, interest module 108 determines that John Brown has a very low interest. Here the media type is adventure, though in this case interest module 108 would determine John Brown's interest level to be very low for most types of content.

As can be readily seen, advertisers, media providers, builders or augmenters of media, and media creators can benefit from knowing a user's interest level. Here assume that the interest level is provided over time for Incredible Family, along with demographic information about John Brown. With this information from numerous demographically similar users, a media creator may learn that male adults are interested in some of the adventure content but that most of the comedy portions are not interesting, at least for this demographic group.

Figure 5:
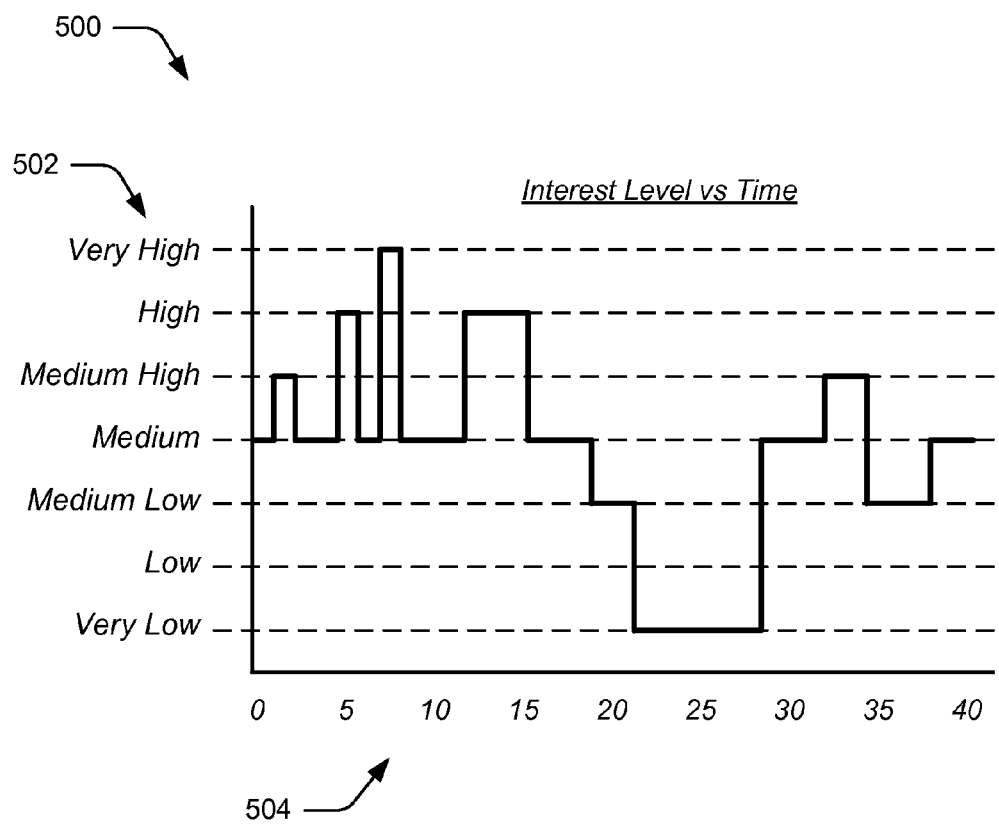
FIG. 5 illustrates a time-based graph of media reactions, the media reactions being interest levels for one user and for forty time periods during presentation of a media program.

Consider, by way of a more-detailed example, FIG. 5, which illustrates a time-based graph 500 having interest levels 502 for forty time periods 504 over a portion of a media program. Here assume that the media program is a movie that includes other media programs—advertisements—at time periods 18 to 30. Interest module 108 determines, as shown, that the user begins with a medium interest level, and then bounces between medium and medium-high, high, and very high interest levels to time period 18. During the first advertisement, which covers time periods 18 to 22, interest module 108 determines that the user has a medium low interest level. For time periods 23 to 28, however, interest module 108 determines that the user has a very low interest level (because he is looking away and talking or left the room, for example). For the last advertisement, which covers time period 28 to 32, however, interest module 108 determines that the user has a medium interest level for time periods 29 to 32—most of the advertisement.

This can be valuable information—the user stayed for the first advertisement, left for the middle advertisement and the beginning of the last advertisement, and returned, with medium interest, for most of the last advertisement. Contrast this resolution and accuracy of interest with some conventional approaches, which likely would provide no information about how many of the people that watched the movie actually watched the advertisements, which ones, and with what amount of interest. If this example is a common trend with the viewing public, prices for advertisements in the middle of a block would go down, and other advertisement prices would be adjusted as well. Or, advertisers and media providers might learn to play shorter advertisement blocks having only two advertisements, for example. Interest levels 502 also provide valuable information about portions of the movie itself, such as through the very high interest level at time period 7 (e.g., a particularly captivating scene of a movie) and the waning interest at time periods 35-38.

Note that, in some cases, engagement levels, while useful, may be less useful or accurate than states and interest levels. For example, state module 106 may determine, for just engagement levels, that a user is not engaged if the user's face is occluded (blocked) and thus not looking at the media program. If the user's face is blocked by that user's hands (skeletal orientation) and audio indicates high-volume audio, state module 106, when determining states, may determine the user to be screaming A screaming state indicates, in conjunction with the content being horror or suspense, an interest level that is very high. This is but one example of where an interest level can be markedly different from that of an engagement level.

As noted above, methods 400 may proceed directly from block 402 to block 406. In such a case, interest module 108, either alone or in conjunction with state module 106, determines an interest level based on the type of media (including multiple media types for different portions of a media program) and the sensor data. By way of example, interest module 108 may determine that for sensor data for John Brown at Time 4, which indicates skeletal movement (arms and body), and high-amplitude audio, and a comedy, athletics, conflict-based talk show, adventure-based video game, tweet, or horror types, that John Brown has a high interest level at Time 4. Conversely, interest module 108 may determine that for the same sensor data at Time 4 for a drama, melodrama, or classical music, that John Brown has a low interest level at Time 4. This can be performed based on the sensor data without first determining an engagement level or state, though this may also be performed.

Block 408, either after block 404 or 406, provides the demographics, identity, engagement, state, and/or interest level. State module 106 or interest module 108 may provide this information to various entities, such as interface module 110, history module 216, control module 220, as well as others.

Providing this information to a builder of a highlight program can enable the highlighter to build a program with portions that are actual highlights, such as a well-received joke in a comedy or an amazing sports play in a sporting program. Providing this information to an augmenter of media programs can enable the augmenter to add media reactions to a presentation of a media program, which may improve the experience for a user. A user may enjoy a comedy more when accompanied with real laughter and at correct times in a comedy program, for example, as compared to a laugh track.

Providing this information to an advertiser after presentation of an advertisement in which a media reaction is determined can be effective to enable the advertiser to measure a value of their advertisements shown during a media program. Providing this information to a media creator can be effective to enable the media creator to assess a potential value of a similar media program or portion thereof. For example, a media creator, prior to releasing the media program to the general public, may determine portions of the media program that are not well received, and thus alter the media program to improve it.

Providing this information to a rating entity can be effective to enable the rating entity to automatically rate the media program for the user. Still other entities, such as control module 220, may use the information to control presentation of media.

Providing media reactions to history module 216 can be effective to enable history module 216 to build and update reaction history 218. History module 216 may build reaction history 218 based on a context or contexts in which each set of media reactions to a media program are received, or the media reactions may, in whole or in part, factor in a context into the media reactions. Thus, a context for a media reaction where the user is watching a television show on a Wednesday night after work may be altered to reflect that the user may be tired from work.

As noted herein, the techniques can determine numerous states for a user over the course of most media programs, even for 15-second advertisements or video snippets. In such a case block 404 is repeated, such as at one-second periods.

Furthermore, state module 106 may determine not only multiple states for a user over time, but also various different states at a particular time. A user may be both laughing and looking away, for example, both of which are states that may be determined and provided or used to determine the user's interest level.

Further still, either or both of state module 106 and interest module 108 may determine engagement, states, and/or interest levels based on historical data in addition to sensor data or media type. In one case a user's historical sensor data is used to normalize the user's engagement, states, or interest levels (e.g., dynamically for a current media reaction). If, for example, Susan Brown is viewing a media program and sensor data for her is received, the techniques may normalize or otherwise learn how best to determine engagement, states, and interest levels for her based on her historical sensor data. If Susan Brown's historical sensor data indicates that she is not a particularly expressive or vocal user, the techniques may adjust for this history. Thus, lower-amplitude audio may be sufficient to determine that Susan Brown laughed compared to amplitude of audio used to determine that a typical user laughed.

In another case, historical engagement, states, or interest levels of the user for which sensor data is received are compared with historical engagement, states, or interest levels for other people. Thus, a lower interest level may be determined for Lydia Brown based on data indicating that she exhibits a high interest for almost every media program she watches compared to other people's interest levels (either generally or for the same media program). In either of these cases the techniques learn over time, and thereby can normalize engagement, states, and/or interest levels.

Methods for Building a Reaction History

As noted above, the techniques may determine a user's engagement, state, and/or interest level for various media programs. Further, these techniques may do so using passive or active sensor data. With these media reactions, the techniques may build a reaction history for a user. This reaction history can be used in various manners as set forth elsewhere herein.

Figure 6:
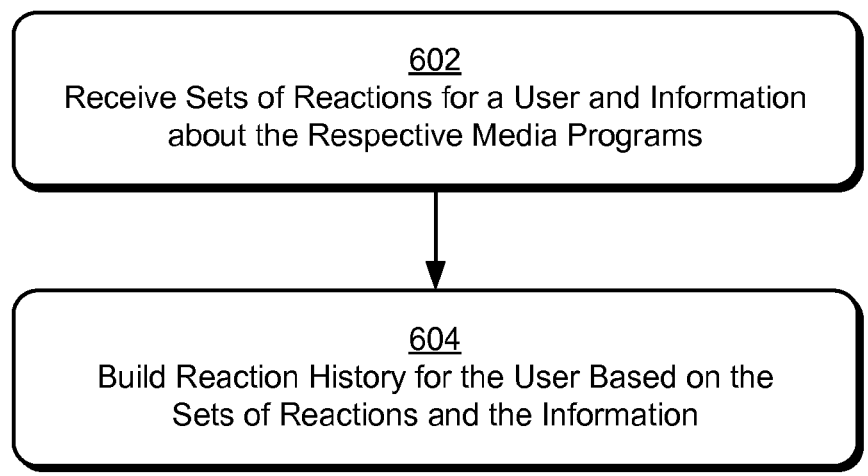
FIG. 6 illustrates example methods for building a reaction history.

FIG. 6 depicts methods 600 for building a reaction history based on a user's reactions to media programs. Block 602 receives sets of reactions of a user, the sets of reactions sensed during presentation of multiple respective media programs, and information about the respective media programs. An example set of reactions to a media program is illustrated in FIG. 5, those shown being a measure of interest level over the time in which the program was presented to the user.

The information about the respective media programs can include, for example, the name of the media (e.g., The Office, Episode 104) and its type (e.g., a song, a television show, or an advertisement) as well as other information set forth herein.

In addition to the media reactions and their respective media programs, block 602 may receive a context for the user during which the media program was presented as noted above.

Further still, block 602 may receive media reactions from other users with which to build the reaction history. Thus, history module 216 may determine, based on the user's media reactions (either in part or after building an initial or preliminary reaction history for the user) other users having similar reactions to those of the user. History module 216 may determine other persons that have similar reactions to those of the user and use those other persons' reactions to programs that the user has not yet seen or heard to refine a reaction history for the user.

Block 604 builds a reaction history for the user based on sets of reactions for the user and information about the respective media programs. As noted, block 604 may also build the user's reaction history using other persons' reaction histories, contexts, and so forth. This reaction history can be used, in some embodiments described elsewhere herein, to control media programs.

Methods for Controlling a Media Program

Figure 7:
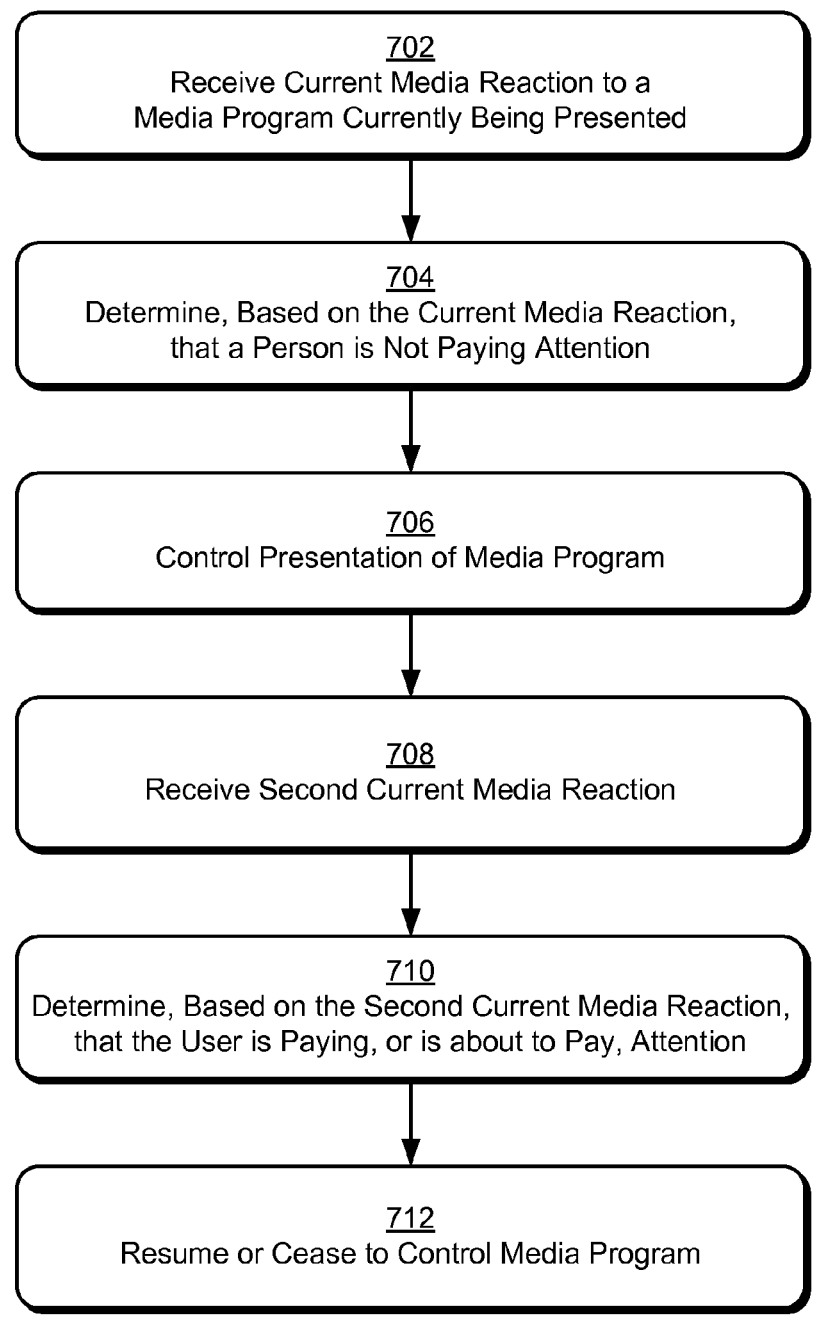
FIG. 7 illustrates example methods for controlling a media program based on a media reaction.

FIG. 7 illustrates methods 700 for controlling a media program based on a media reaction. As noted, the techniques may control a media program without a user's active control (e.g., a dial, keyboard, or remote control), though this not necessarily precluded.

Block 702 receives a current media reaction to a media program that is currently being presented to an audience having one or more persons, the media reaction determined based on sensor data passively sensed during the presentation. These media reactions may include one or more of the many described herein, which may be determined as noted above.

Block 704 determines, based on the current media reaction, that the person is not paying attention to the media program. Media reactions that may indicate that a person is not paying attention include a very low interest level, a low engagement, a departed state, an unrelated talking state, and a looking away state, to name a few.

Assume, for example, that two people named Bob and Janet are watching a movie together in a room in their home. Assume that Janet turns to Bob and comments about the movie. Here assume that control module 220 receives a talking state from state module 106 of FIGS. 1-3. Assume that state module 106 indicates that the talking is related, based on analysis of the first few words spoken by Janet, and that an accompanying looking away state is also received. Control module 220 here determines, based on the talking being related, that Janet's media reaction does not indicate that Janet is not paying attention. Control module 220 may then wait to receive another media reaction at block 702.

Continuing the ongoing example, assume that right after Janet turns to Bob and talks, that Bob looks away from the movie and talks back to Janet. At block 704, control module 220, soon after receiving Janet's related talking and looking away state, receives a looking away state and a talking state for Bob. Control module 220 then determines that Bob is not paying attention to the movie, instead he is paying attention to Janet. Control module 220 may determine that Bob is not paying attention based on his looking away state and his talking state. Control module 220 may instead also consider Janet's states or a reaction history of Bob, such as a reaction history indicating that Bob rarely talks or looks away when watching a media program, for example.

Block 706, responsive to the determination that the person is not paying attention to the media program, controls the presentation of the media program. This control can be performed in real time, quickly, and in various manners. Control module 220 may pause the presentation of the media program, mute or reduce audio of the media program, or stop the presentation of the media program.

Control module 220 may also or instead record a marker at a time or location in the media program commensurate with the current media reaction. This marker can be used later in "rewinding" the media program, as noted below.

Continuing the ongoing example, control module 220 pauses the movie. Control module 220 may wait for another media reaction, as noted below. Control module 220 may also or instead explicitly request a media reaction responsive to which control module 220 ceases to control (e.g., pause) the media program. Here assume that control module 220 pauses the movie and presents a request over the paused movie stating "Please wave your hand to continue the program." Bob or Janet may wave their hand to continue the movie, though here we assume that they continue their conversation while the movie remains paused.

Block 708 receives a second media reaction of the person. The media reaction being received can be the same or a similar media reaction, responsive to which methods 700 continue to control presentation of the media program. Methods 700, therefore, may repeat blocks 702, 704, and 706. While Bob and Janet continue to talk and look away from the movie, for example, control module 220 continues to pause the movie.

At some point, however, assume that Bob looks back at a display presenting the paused movie. In such a case, control module 220 receives a looking toward state rather than receive additional looking away states.

Block 710 determines, based on the second media reaction, that the person is paying, or is ready to pay, attention to the media program. The media reactions on which block 710 determines that a person is paying attention or is ready to pay attention may vary, including based on the person's reaction history. Media reactions that may indicate that a user is paying attention include a medium or higher interest level, a medium or higher engagement, a looking toward state, a leaning toward state, and a newly arrived state, to name a few.

Continuing the ongoing example, at block 710 control module 220 receives a looking toward state for Bob. Control module 220 determines that Bob is now paying attention because he is looking at the paused movie.

Block 712, responsive to determining that the user is, or is about to be paying, attention to the media program, ceases to control and/or resumes the media program. As noted above, controlling the presentation of the media program may include pausing, muting, or stopping the media program, among others. Thus, control module 220 may cease to pause the media program, cease to mute the audio of the media program, or resume the media program.

In some cases, however, control module 220 rewinds the media program a particular amount of time, such as two seconds, or presents the media program at a beginning of a cohesive portion of the media program during which the control occurred.

In the example of Bob and Janet above, assume that control module 220 paused the movie during a particular scene during which Bob was not paying attention. Control module 220 may rewind the media program to the beginning of that same scene. This may depend on the length of the distraction of the audience. Control module 220 may rewind and begin play at a beginning of a scene when the distraction was more than momentary. Thus, assume that Bob and Janet talk for five minutes. In such a case control module 220 may rewind to the beginning of the scene. If Bob and Janet instead talked only for four seconds, control module 220 may instead simply cease to pause the movie or rewind just a few seconds.

As noted above, control module 220 may record a marker at a time or location in the media program. This marker may aid control module 220, such as in cases where control module 220 does not pause the media program, but instead mutes or turns down the volume but allows the media program to continue to be presented.

Assume, by way of a different example, that two people are listening to an album having thirty songs. Control module 220 may turn the volume down, but not off or stop the songs, responsive to the two people beginning to talk. Control module 220 may mark this location and, if the lack of attention lasts for a few minutes or more, rewind to the beginning of the song to replay it at regular volume when the talking stops.

Control module 220 may analyze metadata associated with the location or time to determine a cohesive portion at which the control was exercised. Thus, control module 220 may determine, based on metadata for the movie at the marked location in the media program, that the current portion of the media program is part of a scene having a beginning at a particular time in the media program. Control module 220 may then resume presentation of the media program at the particular time to replay the beginning of the scene.

Figure 8:
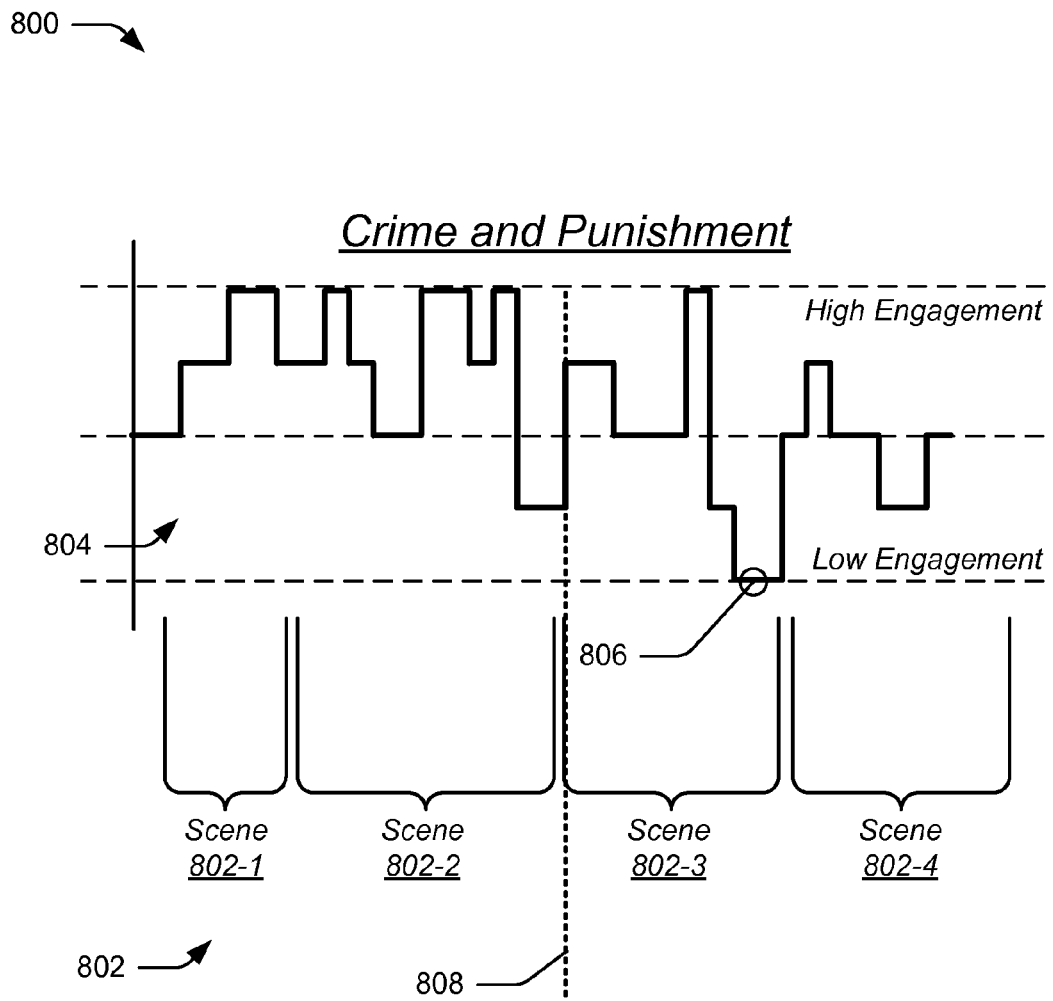
FIG. 8 illustrates scenes of a media program along with media reactions for a person watching the media program.

By way of illustration, consider FIG. 8, which illustrates a media program 800, scenes 802, here scenes 802-1, 802-2, 802-3, and 802-4, in a first five minutes of a television drama entitled Crime and Punishment, along with engagements 804 for a person watching the television drama. Assume that during scene 802-3, control module 220 receives a media reaction of a low engagement. Based on this low engagement, control module 220 reduces the volume and marks the point at which the volume is reduced, shown at mark 806. Control module 220 determines that this reduced volume control shown at mark 806 is within scene 802-3. Responsive to determining to play the scene over again, control module 220 presents the television drama at the beginning of scene 802-3, shown at scene start 808.

Methods 700 may operate alone or in conjunction with other methods described herein, such as methods 400, 600, 900, and/or 1000. This description continues with other methods also describing techniques for controlling a media program.

Figure 9:
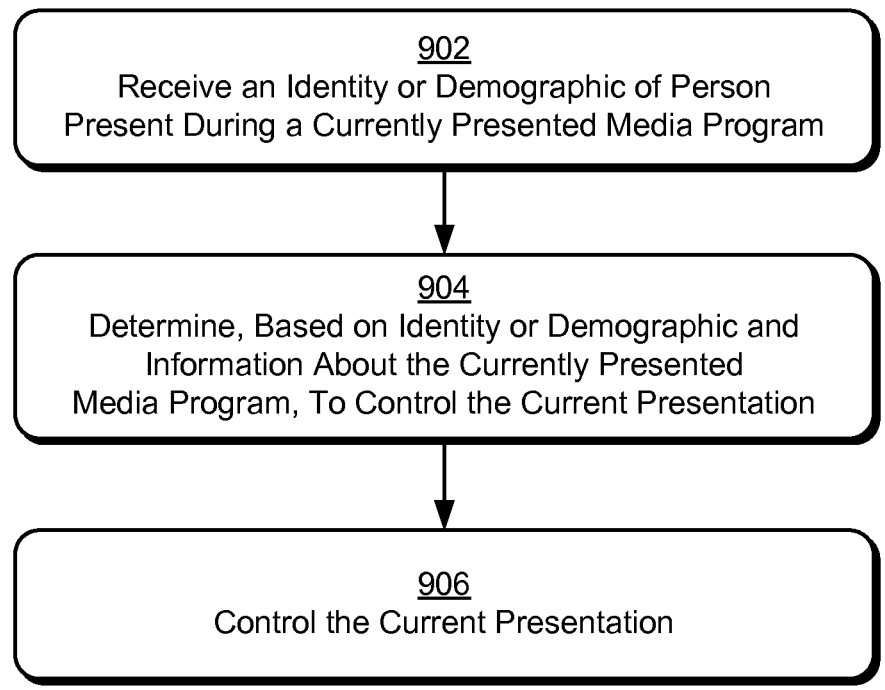
FIG. 9 illustrates example methods for controlling a media program based on an identity or demographic of a person.

FIG. 9 illustrates methods 900 for controlling a media program based on an identity or demographic of a person. Methods 900 may operate in conjunction with, or similarly to methods 700, such as by recording a marker or determining a cohesive portion of a media program at which to continue presentation of a media program after controlling the presentation is no longer desired, and so forth.

Block 902 receives an identity or a demographic of a person, the identity or demographic determined based on sensor data passively sensed during a current presentation of a media program. As noted herein, the identity or demographic can be determined from a media reaction, though in some cases it may also be determined based on sensor data without also determining a media reaction for the person.

Block 904 determines, based on the identity or the demographic and information about the media program, to control the current presentation of the media program. This information may indicate, for example, that the media program is of a particular type, such as being a horror or suspense program, or that the program is rated unsuitable for children, and so forth.

Block 906 controls the current presentation of the media program. This control of the current presentation can include those noted for methods 700, though block 906 may alter the presentation in additional ways not set forth above.

Assume, for example, that the identity or the demographic of the person indicates that the person is a minor and the information indicates that the media program or a currently presented portion of the media program is not appropriate for presentation to minors. In such a case, control module 220 may pause, stop, or mute the media program as above, though control module 220 may instead alter the presentation by blacking out or substantially reducing the resolution of video portion of the presentation (e.g., pixilation of the video) and lowering the volume. For the movie example above, assume that Bob and Janet's six-year-old daughter walks in unexpectedly into the room while the movie is playing. In response, control module 220 may partially obscure or reduce the resolution of the movie while also lowering the volume but may forgo stopping or pausing the program.

Furthermore, if an identity is received, control module 220 may determine a reaction history associated with the person. In such a case, control module 220 may determine, at block 904, whether or not to control the current presentation and, if control is determined, how to control the presentation. For example, assume that the information about the portion of the media program indicates that coarse language is about to be presented for the media program and that the reaction history indicates that a person in the audience has a history of dislike or sensitivity to coarse language. In such an example, control module 220 may lower the volume of the presentation during the coarse language.

Consider again Bob and Janet from the above movie example. Here assume that control module 220 receives or determines Janet's identity and an associated reaction history. Control module 220 determines, based on this reaction history that Janet is very sensitive to, and is offended by animals shown in distress. Control module 220, for much of a media program, may determine that no control is needed. Assume for a particular upcoming scene, however, that control module 220 determines, based on metadata for the media program associated with portions of the movie (e.g., information 212 about portions 214 of media program 210 all of FIG. 2), that a dog is hit by a car in this upcoming scene. Control module 220 may obscure, reduce the resolution of, or otherwise alter the video presentation. Note that the techniques, in so doing, may not only permit people to better enjoy media programs by enabling people to forgo actively controlling programs in many cases, but may enable people to enjoy programs that they might otherwise not watch at all.

Thus, assume that a child's parents have decided that a popular comedy show would be fine for the child to watch except for the coarse language, as the comedy otherwise has many redeeming qualities. It may be nearly impossible for the child to enjoy the comedy without hearing the coarse language—the alternative is having a parent attentively holding a mute button on a remote (which may still fail to mute all the coarse language) or watch the comedy without any audio (which would likely make watching the comedy pointless). The techniques, however, enable the child to watch the comedy without the parent needing to actively control the program.

Control module 220, after the portion of the media program being controlled is no longer being presented, such as by being fully presented or skipped, ceases to control the media program. Thus, control module 220 may cease to mute the coarse language when the course language is done or skipped, or obscure the scene showing the animal in distress when that scene is done.

Figure 10:
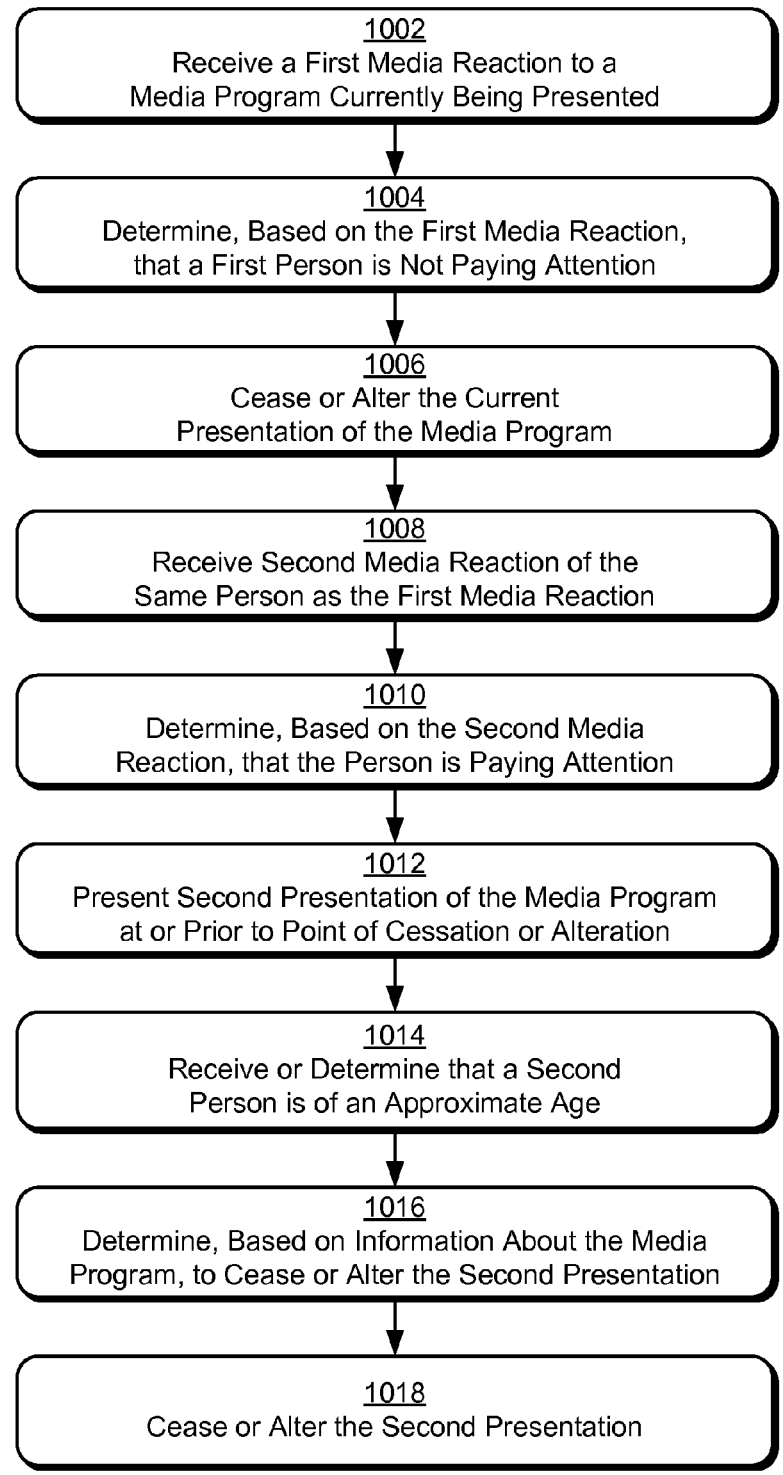
FIG. 10 illustrates example methods for controlling a media program based on media reactions of multiple persons.

FIG. 10 illustrates methods 1000 for controlling a media program based on a media reaction of multiple persons. Methods 1000 may operate in conjunction with, or similarly to, methods 700 and/or 900, though this is not required.

Block 1002 receives a first media reaction to a media program that is currently being presented to an audience having one or more persons, the first media reaction determined based on sensor data passively sensed during the current presentation and of a first person of the one or more persons.

Block 1004 determines, based on the first media reaction, that the first person is not paying attention to the media program. Control module 220 may do so in one or more of the various manner described above. Some media reactions do not indicate that a person is not paying attention, and some that do indicate that a person is not paying attention may be ignored in some cases. A departed state, for example, may indicate that control of the media program is warranted, though this is not always the case. If an advertisement has just begun, a departed state may not indicate that ceasing a current presentation of the media program (and thus the advertisement) is warranted. Similarly, a low-interest level during an advertisement also may not indicate that control module 220 should cease the presentation of the media program.

Block 1006, responsive to determining that the first person is not paying attention to the media program, ceases or alters the current presentation of the media program, such as by stopping, pausing, or muting the current presentation.

Block 1008 receives a second media reaction of the first person. Control module 220 may determine that this media reaction is from the same person as the first media reaction, though the media reactions received may also be labeled or otherwise include an indicator to associate the media reaction with a person in the audience, whether or not the identities of the persons are known.

Block 1010 determines, based on the second media reaction, that the first person is paying or is about to pay attention to the media program.

Block 1012 presents a second presentation of the media program at or prior to a point at which the current presentation ceased or was altered. As described above, presenting a media program at or prior to the point at which the current presentation ceased or was altered can be performed based on determining a cohesive portion, such as a scene or a song, at which to begin presentation. Presenting the media program can be performed automatically and without user interaction, though this is not required.

Block 1014 receives or determines that a second person of the one or more persons in the audience is of an approximate age. The approximate age can be based on an identity or demographic determined for the second person, which may be received or determined. If determined, the approximate age may be based on a media reaction of the second person, which can be as simple as receiving a "newly present state" as noted above.

Block 1016 determines, based on information about the media program and that the second person is of the approximate age, to cease or alter the second presentation of the media program.

Block 1018 ceases or alters the second presentation of the media program. Control module 220 may resume the media program by presenting the media program again, in the various manners set forth above, responsive to determining that the second person is no longer present, such as by receiving a departed state from state module 106 of FIGS. 1-3.

These are but a few of the many ways that the techniques may enable people to better enjoy or control media programs.

The preceding discussion describes methods relating to controlling a media program based on a media reaction, as well as other methods and techniques. Aspects of these methods may be implemented in hardware (e.g., fixed logic circuitry), firmware, software, manual processing, or any combination thereof A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1-3 and 11 (device 1100 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., state module 106, interest module 108, interface module 110, history module 216, and control module 220) represent program code that performs specified tasks when executed on a processor (e.g., processor(s) 204 and/or 306). The program code can be stored in one or more computer-readable memory devices, such as CRM 206 and/or remote CRM 308 or computer-readable storage media 1114 of FIG. 11.

Example Device

Figure 11:
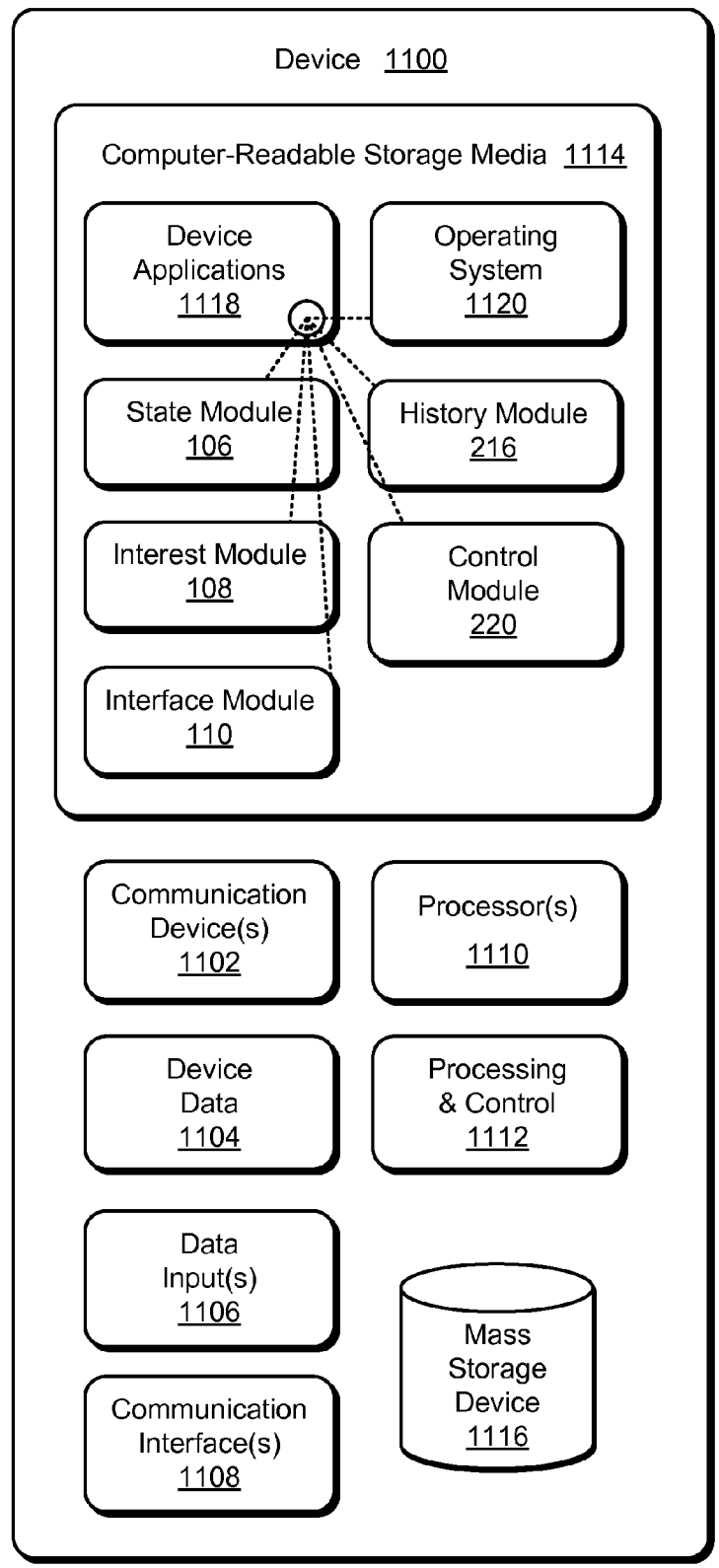
FIG. 11 illustrates an example device in which techniques for controlling a media program based on a media reaction, as well as other techniques, can be implemented.

FIG. 11 illustrates various components of example device 1100 that can be implemented as any type of client, server, and/or computing device as described with reference to the previous FIGS. 1-10 to implement techniques for controlling a media program based on a media reaction. In embodiments, device 1100 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device (e.g., media programs 210), and/or information associated with a user of the device. Media content stored on device 1100 can include any type of audio, video, and/or image data. Device 1100 includes one or more data inputs 1106 via which any type of data, media content, and/or inputs can be received, such as human utterances, user-selectable inputs, messages, music, television media content, media reactions, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to enable techniques for controlling a media program based on a media reaction and other methods described herein. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage device 1116.

Computer-readable storage media 1114 provides data storage mechanisms to store device data 1104, as well as various device applications 1118 and any other types of information and/or data related to operational aspects of device 1100. For example, an operating system 1120 can be maintained as a computer application with computer-readable storage media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components, engines, or modules to implement techniques for controlling a media program based on a media reaction. In this example, device applications 1118 can include state module 106, interest module 108, interface module 110, history module 216, and/or control module 220.

CONCLUSION

Although embodiments of techniques and apparatuses for controlling a media program based on a media reaction have been described in language specific to features and/or methods, it is to be understood that the subject of the appended claims is not necessarily limited to the specific features or methods described. Rather, the specific features and methods are disclosed as example implementations for controlling a media program based on a media reaction.

What is claimed is:

1. A computer-implemented method comprising:
receiving a current media reaction to a media program that is currently being presented to an audience having one or more persons, the media reaction determined based on sensor data passively sensed during the presentation and of at least one person of the one or more persons;
determining an engagement of the person based on a head orientation or a skeletal orientation included in the sensor data passively sensed during the presentation of the media program;
determining, by a computing device and based on the determined engagement and the current media reaction of the person comprising audio that is unrelated to the media program, that the person is not paying attention to the media program; and responsive to determining that the person is not paying attention to the media program, controlling the presentation of the media program;

responsive to determining that the person is paying attention to the media program based on the determined engagement and the current media reaction of the person comprising audio that is related to the media program, waiting to receive another media reaction.

2. A computer-implemented method as described in claim 1, wherein controlling the presentation of the media program includes pausing the media program or muting audio of the media program.

3. A computer-implemented method as described in claim 1, further comprising, after controlling the presentation of the media program:

receiving a second media reaction of the person;

determining, based on the second media reaction, that the person is paying, or is ready to pay, attention to the media program; and responsive to determining that the person is paying, or is ready to pay, attention to the media program ceasing to control the presentation of the media program.

4. A computer-implemented method as described in claim 3, wherein controlling the presentation of the media program pauses the presentation of the media program and ceasing to control the presentation ceases to pause the presentation of the media program, rewinds the media program at least one second, and resumes the presentation of the media program.

5. A computer-implemented method as described in claim 3, wherein controlling the presentation of the media program stops or pauses the presentation of the media program and ceasing to control the presentation resumes the presentation of the media program at a beginning of a cohesive portion of the media program during which the stop or pause occurred.

6. A computer-implemented method as described in claim 3, wherein controlling the presentation of the media program mutes or reduces a volume of audio of the media program and ceasing to control the presentation resumes, at or prior to a time at which the control occurred, the presentation of the media program without the muting or the reducing of the volume of the audio.

7. A computer-implemented method as described in claim 3, wherein the second media reaction is a medium or higher interest level, a medium or higher engagement, a looking toward state, a leaning toward state, or a newly arrived state.

8. A computer-implemented method as described in claim 1, wherein controlling the presentation of the media program records a marker at a time or location in the media program commensurate with the current media reaction and further comprising:

receiving a second media reaction of the person;

determining, based on the second media reaction, that the person is paying, or is ready to pay, attention to the media program; and responsive to determining that the person is paying, or is ready to pay, attention to the media program, resuming, based on the marker, the media program at or prior to the time or the location.

9. A computer-implemented method as described in claim 8, further comprising determining, based on metadata for portions of the media program and the marker, a beginning of a cohesive portion of the media program, and wherein resuming the media program at or prior to the time or the location resumes the media program at the beginning of the cohesive portion.

10. A computer-implemented method as described in claim 9, wherein the media program is a set of songs and the cohesive portion is a song in the set, the media program is movie or television show and the cohesive portion is a scene of the movie or the television show, or the media program is a slideshow of images and the cohesive portion is an image of the slideshow.

11. A computer-implemented method as described in claim 1, wherein the current media reaction further comprises a very low interest level, a departed state, or a looking away state.

12. One or more computer-readable storage memories having instructions thereon that, when executed by one or more processors, perform a method comprising:

receiving a current media reaction to a media program that is currently being presented to an audience having one or more persons, the media reaction determined based on sensor data passively sensed during the presentation and of at least one person of the one or more persons;

determining an engagement of the person based on a head orientation or a skeletal orientation included in the sensor data passively sensed during the presentation of the media program;

determining, by a computing device and based on the determined engagement and the current media reaction of the person comprising audio that is unrelated to the media program, that the person is not paying attention to the media program; and responsive to determining that the person is not paying attention to the media program, controlling the presentation of the media program;

responsive to determining that the person is paying attention to the media program based on the determined engagement and the current media reaction of the person comprising audio that is related to the media program, waiting to receive another media reaction.

13. One or more computer-readable storage memories as described in claim 12, wherein the media program is a set of songs, a movie or television show, or a slideshow of images.

14. One or more computer-readable storage memories as described in claim 12, wherein controlling the presentation of the media program includes pausing the media program or muting audio of the media program.

15. One or more computer-readable storage memories as described in claim 12, wherein controlling the presentation ceases or alters the presentation.

16. One or more computer-readable storage memories as described in claim 12, further comprising, building a reaction history that includes the determined engagement of the person, the current media reaction of the person, and a context for the person during presentation of the media program and wherein the controlling the presentation of the media program is based, at least in part, on the reaction history.

17. One or more computer-readable storage memories as described in claim 12, further comprising receiving a context for the person during presentation of the media program and wherein the controlling the presentation of the media program is based, at least in part, on the received context.

18. A system comprising:

one or more processors; and memory storing instructions that, responsive to execution by the one or more processors, configure the one or more processors to perform operations comprising:

receiving a current media reaction to a media program that is currently being presented to an audience having one or more persons, the media reaction determined based on sensor data passively sensed during the presentation and of at least one person of the one or more persons;

determining an engagement of the person based on a head orientation or a skeletal orientation included in the sensor data passively sensed during the presentation of the media program;

determining, based on the determined engagement and the current media reaction of the person comprising audio that is unrelated to the media program, that the person is not paying attention to the media program; and responsive to determining that the person is not paying attention to the media program, controlling the presentation of the media program;

responsive to determining that the person is paying attention to the media program based on the determined engagement and the current media reaction of the person comprising audio that is related to the media program, waiting to receive another media reaction.

19. A system as described in claim 18, wherein controlling the presentation of the media program includes altering the current presentation to obscure, or reduce a resolution of, a visual portion of the presentation but does not cease the presentation.

20. A system as described in claim 18, wherein controlling the presentation of the media program includes pausing the media program or muting audio of the media program.

* * * * *